US011392860B2

(12) United States Patent
Mullen et al.

(10) Patent No.: US 11,392,860 B2
(45) Date of Patent: Jul. 19, 2022

(54) SYSTEMS AND METHODS FOR CONTACTLESS COMMUNICATION MECHANISMS FOR CARDS AND MOBILE DEVICES

(75) Inventors: Jeffrey D. Mullen, Pittsburgh, PA (US); Christopher J. Rigatti, Pittsburgh, PA (US); Michael T. Wallace, Payson, AZ (US)

(73) Assignee: DYNAMICS INC., Pittsburgh, PA (US)

( * ) Notice: Subject to any disclaimer, the term of this patent is extended or adjusted under 35 U.S.C. 154(b) by 523 days.

(21) Appl. No.: 13/468,625

(22) Filed: May 10, 2012

(65) Prior Publication Data

US 2012/0286936 A1     Nov. 15, 2012

Related U.S. Application Data

(60) Provisional application No. 61/484,547, filed on May 10, 2011, provisional application No. 61/585,566, filed on May 10, 2011, provisional application No. 61/484,576, filed on May 10, 2011, provisional application No. 61/484,588, filed on May 10, 2011.

(51) Int. Cl.
*G06Q 10/00* (2012.01)
*G06Q 40/00* (2012.01)
*G06Q 20/32* (2012.01)
*G06Q 20/22* (2012.01)
*G06Q 20/34* (2012.01)
*G06Q 20/38* (2012.01)

(52) U.S. Cl.
CPC ........... *G06Q 10/00* (2013.01); *G06Q 20/223* (2013.01); *G06Q 20/322* (2013.01); *G06Q 20/3278* (2013.01); *G06Q 20/352* (2013.01); *G06Q 20/385* (2013.01); *G06Q 40/00* (2013.01)

(58) Field of Classification Search
CPC ............ G06K 7/0008; G06K 19/0718; G06K 19/0723; G06K 19/07749; G06Q 20/3278; G06Q 20/352
USPC ... 340/10.1, 10.2, 10.5, 572.1, 572.4, 572.7; 235/492; 156/242
See application file for complete search history.

(56) References Cited

U.S. PATENT DOCUMENTS

| 5,960,344 | A  | * | 9/1999  | Mahany ................... 455/432.2 |
| 7,432,816 | B1 | * | 10/2008 | Ku et al. ................... 340/572.7 |
| 7,784,687 | B2 |   | 8/2010  | Mullen et al. |
| 7,793,851 | B2 |   | 9/2010  | Mullen |
| 7,828,220 | B2 |   | 11/2010 | Mullen |
| 7,931,195 | B2 |   | 4/2011  | Mullen |
| 7,954,705 | B2 |   | 6/2011  | Mullen |
| D643,063  | S  |   | 8/2011  | Mullen et al. |

(Continued)

*Primary Examiner* — Mirza F Alam
(74) *Attorney, Agent, or Firm* — Andrew Veter

(57) ABSTRACT

A card may be formed using two or more printed circuit boards. Each printed circuit board may include one or more RFID antennas, RFID chips and a processor. A processor on a board may transfer data to one or more RFID chips on the same board. Alternately, a processor on a board may transfer data to one or more RFID chips on a different board via conductive terminals between boards. Data stored in one or more RFID chips may be erased after being communicated to an RFID device via an RFID antenna or after a configurable timeout period elapses. A card and a mobile device may include more than one RFID antenna to increase efficiency, reliability, and/or a number of data channels that may be communicated.

20 Claims, 12 Drawing Sheets

(56) References Cited

U.S. PATENT DOCUMENTS

| | | | |
|---|---|---|---|
| 8,011,577 B2 | 9/2011 | Mullen et al. | |
| 8,020,775 B2 | 9/2011 | Mullen et al. | |
| 8,066,191 B1 | 11/2011 | Cloutier et al. | |
| D651,237 S | 12/2011 | Mullen et al. | |
| D651,238 S | 12/2011 | Mullen et al. | |
| 8,074,877 B2 | 12/2011 | Mullen et al. | |
| D651,644 S | 1/2012 | Mullen et al. | |
| D652,075 S | 1/2012 | Mullen et al. | |
| D652,076 S | 1/2012 | Mullen et al. | |
| D652,448 S | 1/2012 | Mullen et al. | |
| D652,449 S | 1/2012 | Mullen et al. | |
| D652,450 S | 1/2012 | Mullen et al. | |
| D652,867 S | 1/2012 | Mullen et al. | |
| D653,288 S | 1/2012 | Mullen et al. | |
| 8,172,148 B1 | 5/2012 | Cloutier et al. | |
| D665,022 S | 8/2012 | Mullen et al. | |
| D665,447 S | 8/2012 | Mullen et al. | |
| D666,241 S | 8/2012 | Mullen et al. | |
| 8,282,007 B1 | 10/2012 | Cloutier et al. | |
| 8,286,876 B2 | 10/2012 | Mullen et al. | |
| D670,759 S | 11/2012 | Mullen et al. | |
| 8,302,872 B2 | 11/2012 | Mullen | |
| D672,389 S | 12/2012 | Mullen et al. | |
| 8,322,623 B1 | 12/2012 | Mullen et al. | |
| D674,013 S | 1/2013 | Mullen et al. | |
| 8,348,172 B1 | 1/2013 | Cloutier et al. | |
| 8,382,000 B2 | 2/2013 | Mullen et al. | |
| 8,390,456 B2 * | 3/2013 | Puleston et al. | 340/572.1 |
| 8,393,545 B1 | 3/2013 | Mullen et al. | |
| 8,393,546 B1 | 3/2013 | Yen et al. | |
| 8,413,892 B2 | 4/2013 | Mullen et al. | |
| 8,424,773 B2 | 4/2013 | Mullen et al. | |
| 8,459,548 B2 | 6/2013 | Mullen et al. | |
| D687,094 S | 7/2013 | Mullen et al. | |
| 8,485,437 B2 | 7/2013 | Mullen et al. | |
| 8,485,446 B1 | 7/2013 | Mullen et al. | |
| 8,511,574 B1 | 8/2013 | Yen et al. | |
| 8,517,276 B2 | 8/2013 | Mullen et al. | |
| 8,523,059 B1 | 9/2013 | Mullen et al. | |
| 8,561,894 B1 | 10/2013 | Mullen et al. | |
| 8,567,679 B1 | 10/2013 | Mullen et al. | |
| 8,573,503 B1 | 11/2013 | Cloutier et al. | |
| 8,579,203 B1 * | 11/2013 | Lambeth et al. | 235/492 |
| 8,585,850 B2 * | 11/2013 | Muirhead | 156/242 |
| 8,590,796 B1 | 11/2013 | Cloutier et al. | |
| 8,602,312 B2 | 12/2013 | Cloutier et al. | |
| 8,608,083 B2 | 12/2013 | Mullen et al. | |
| 8,622,309 B1 | 1/2014 | Mullen et al. | |
| 8,668,143 B2 | 3/2014 | Mullen et al. | |
| 8,727,219 B1 | 5/2014 | Mullen | |
| 8,733,638 B2 | 5/2014 | Mullen et al. | |
| 8,746,579 B1 | 6/2014 | Cloutier et al. | |
| 8,757,483 B1 | 6/2014 | Mullen et al. | |
| 8,757,499 B2 | 6/2014 | Cloutier et al. | |
| 8,814,050 B1 | 8/2014 | Mullen et al. | |
| 8,820,638 B1 * | 9/2014 | Cotter | G06Q 40/02 235/380 |
| 8,875,999 B2 | 11/2014 | Mullen et al. | |
| 8,881,989 B2 | 11/2014 | Mullen et al. | |
| 8,931,703 B1 | 1/2015 | Mullen et al. | |
| 8,944,333 B1 | 2/2015 | Mullen et al. | |
| 8,973,824 B2 | 3/2015 | Mullen et al. | |
| 9,004,368 B2 | 4/2015 | Mullen et al. | |
| 9,010,630 B2 | 4/2015 | Mullen et al. | |
| 9,053,398 B1 | 6/2015 | Cloutier | |
| 9,064,255 B1 | 6/2015 | Mullen et al. | |
| 9,292,843 B1 | 3/2016 | Mullen et al. | |
| 9,306,666 B1 | 4/2016 | Zhang et al. | |
| 9,329,619 B1 | 5/2016 | Cloutier | |
| 9,361,569 B2 | 6/2016 | Mullen et al. | |
| 9,373,069 B2 | 6/2016 | Cloutier et al. | |
| 9,384,438 B2 | 7/2016 | Mullen et al. | |
| 9,547,816 B2 | 1/2017 | Mullen et al. | |
| 9,639,796 B2 | 5/2017 | Mullen et al. | |
| 9,646,240 B1 | 5/2017 | Mullen et al. | |
| 9,652,436 B1 | 5/2017 | Yen et al. | |
| 9,684,861 B2 | 6/2017 | Mullen et al. | |
| D792,511 S | 7/2017 | Mullen et al. | |
| D792,512 S | 7/2017 | Mullen et al. | |
| D792,513 S | 7/2017 | Mullen et al. | |
| 9,697,454 B2 | 7/2017 | Mullen et al. | |
| 9,704,088 B2 | 7/2017 | Mullen et al. | |
| 9,704,089 B2 | 7/2017 | Mullen et al. | |
| 9,721,201 B1 | 8/2017 | Mullen et al. | |
| 9,727,813 B2 | 8/2017 | Mullen et al. | |
| 9,805,297 B2 | 10/2017 | Mullen et al. | |
| 9,818,125 B2 | 11/2017 | Mullen et al. | |
| 9,836,680 B1 | 12/2017 | Cloutier | |
| 9,852,368 B1 | 12/2017 | Yen et al. | |
| 9,875,437 B2 | 1/2018 | Cloutier et al. | |
| 9,928,456 B1 | 3/2018 | Cloutier et al. | |
| 9,953,255 B1 | 4/2018 | Yen et al. | |
| 10,022,884 B1 | 7/2018 | Cloutier | |
| 10,032,100 B2 | 7/2018 | Mullen et al. | |
| 10,055,614 B1 | 8/2018 | Cloutier et al. | |
| 10,095,970 B1 | 10/2018 | Mullen | |
| 10,095,974 B1 | 10/2018 | Mullen et al. | |
| 10,169,692 B2 | 1/2019 | Mullen et al. | |
| 10,176,419 B1 | 1/2019 | Cloutier et al. | |
| 10,176,423 B1 | 1/2019 | Mullen et al. | |
| 10,181,097 B1 | 1/2019 | Mullen et al. | |
| 10,198,687 B2 | 2/2019 | Mullen et al. | |
| 10,223,631 B2 | 3/2019 | Mullen et al. | |
| 10,255,545 B2 | 4/2019 | Mullen et al. | |
| 10,325,199 B2 | 6/2019 | Mullen et al. | |
| 10,430,704 B2 | 10/2019 | Mullen et al. | |
| 10,467,521 B2 | 11/2019 | Mullen et al. | |
| 10,482,363 B1 | 11/2019 | Cloutier et al. | |
| 10,496,918 B2 | 12/2019 | Mullen et al. | |
| 10,504,105 B2 | 12/2019 | Mullen et al. | |
| 10,579,920 B2 | 3/2020 | Mullen et al. | |
| 10,693,263 B1 | 6/2020 | Mullen et al. | |
| 10,948,964 B1 | 3/2021 | Cloutier | |
| 10,997,489 B2 | 5/2021 | Mullen et al. | |
| 11,062,195 B2 | 7/2021 | Mullen | |
| 2005/0207624 A1 * | 9/2005 | Ehlers | G06K 19/0718 382/124 |
| 2006/0109119 A1 * | 5/2006 | Burr et al. | 340/572.1 |
| 2007/0125866 A1 * | 6/2007 | Nishizawa | G06K 19/07718 235/492 |
| 2007/0273519 A1 * | 11/2007 | Ichikawa et al. | 340/572.1 |
| 2008/0029607 A1 | 2/2008 | Mullen | |
| 2008/0035738 A1 | 2/2008 | Mullen | |
| 2008/0054068 A1 | 3/2008 | Mullen | |
| 2008/0054079 A1 | 3/2008 | Mullen | |
| 2008/0054081 A1 | 3/2008 | Mullen | |
| 2008/0065555 A1 | 3/2008 | Mullen | |
| 2008/0072423 A1 * | 3/2008 | Finn | 29/854 |
| 2008/0074269 A1 * | 3/2008 | Torchalski et al. | 340/572.4 |
| 2008/0094220 A1 * | 4/2008 | Foley | G06Q 20/3278 340/572.4 |
| 2008/0302869 A1 | 12/2008 | Mullen | |
| 2008/0302876 A1 | 12/2008 | Mullen | |
| 2008/0308641 A1 * | 12/2008 | Finn | G06K 19/07749 235/492 |
| 2008/0309463 A1 * | 12/2008 | Godzwon et al. | 340/10.1 |
| 2009/0159663 A1 | 6/2009 | Mullen et al. | |
| 2009/0159667 A1 | 6/2009 | Mullen et al. | |
| 2009/0159668 A1 | 6/2009 | Mullen et al. | |
| 2009/0159669 A1 | 6/2009 | Mullen et al. | |
| 2009/0159670 A1 | 6/2009 | Mullen et al. | |
| 2009/0159671 A1 | 6/2009 | Mullen et al. | |
| 2009/0159672 A1 | 6/2009 | Mullen et al. | |
| 2009/0159673 A1 | 6/2009 | Mullen et al. | |
| 2009/0159680 A1 | 6/2009 | Mullen et al. | |
| 2009/0159681 A1 | 6/2009 | Mullen et al. | |
| 2009/0159682 A1 | 6/2009 | Mullen et al. | |
| 2009/0159688 A1 | 6/2009 | Mullen et al. | |
| 2009/0159689 A1 | 6/2009 | Mullen et al. | |
| 2009/0159690 A1 | 6/2009 | Mullen et al. | |
| 2009/0159696 A1 | 6/2009 | Mullen | |
| 2009/0159697 A1 | 6/2009 | Mullen et al. | |
| 2009/0159698 A1 | 6/2009 | Mullen et al. | |
| 2009/0159699 A1 | 6/2009 | Mullen et al. | |

(56) References Cited

U.S. PATENT DOCUMENTS

| | | |
|---|---|---|
| 2009/0159701 A1 | 6/2009 | Mullen et al. |
| 2009/0159702 A1 | 6/2009 | Mullen |
| 2009/0159703 A1 | 6/2009 | Mullen et al. |
| 2009/0159704 A1 | 6/2009 | Mullen et al. |
| 2009/0159705 A1 | 6/2009 | Mullen et al. |
| 2009/0159706 A1 | 6/2009 | Mullen et al. |
| 2009/0159707 A1 | 6/2009 | Mullen et al. |
| 2009/0159708 A1 | 6/2009 | Mullen et al. |
| 2009/0159709 A1 | 6/2009 | Mullen |
| 2009/0159710 A1 | 6/2009 | Mullen et al. |
| 2009/0159711 A1 | 6/2009 | Mullen et al. |
| 2009/0159712 A1 | 6/2009 | Mullen et al. |
| 2009/0159713 A1 | 6/2009 | Mullen et al. |
| 2009/0160617 A1* | 6/2009 | Mullen et al. ................ 340/10.1 |
| 2009/0308921 A1 | 12/2009 | Mullen |
| 2010/0123561 A1* | 5/2010 | Nam ................... G06K 7/10237 340/10.5 |
| 2010/0123583 A1* | 5/2010 | Bommer et al. ............ 340/572.7 |
| 2010/0207737 A1* | 8/2010 | Park et al. .................... 340/10.2 |
| 2010/0223479 A1* | 9/2010 | Nguyen ................ H04L 9/3215 713/193 |
| 2011/0272465 A1 | 11/2011 | Mullen et al. |
| 2011/0272466 A1 | 11/2011 | Mullen et al. |
| 2011/0272467 A1 | 11/2011 | Mullen et al. |
| 2011/0272471 A1 | 11/2011 | Mullen |
| 2011/0272472 A1 | 11/2011 | Mullen |
| 2011/0272473 A1 | 11/2011 | Mullen et al. |
| 2011/0272474 A1 | 11/2011 | Mullen et al. |
| 2011/0272475 A1 | 11/2011 | Mullen et al. |
| 2011/0272476 A1 | 11/2011 | Mullen et al. |
| 2011/0272477 A1 | 11/2011 | Mullen et al. |
| 2011/0272478 A1 | 11/2011 | Mullen |
| 2011/0272479 A1 | 11/2011 | Mullen |
| 2011/0272480 A1 | 11/2011 | Mullen et al. |
| 2011/0272481 A1 | 11/2011 | Mullen et al. |
| 2011/0272482 A1 | 11/2011 | Mullen et al. |
| 2011/0272483 A1 | 11/2011 | Mullen et al. |
| 2011/0272484 A1 | 11/2011 | Mullen et al. |
| 2011/0276380 A1 | 11/2011 | Mullen et al. |
| 2011/0276381 A1 | 11/2011 | Mullen et al. |
| 2011/0276416 A1 | 11/2011 | Mullen et al. |
| 2011/0276424 A1 | 11/2011 | Mullen |
| 2011/0276425 A1 | 11/2011 | Mullen |
| 2011/0276436 A1 | 11/2011 | Mullen et al. |
| 2011/0276437 A1 | 11/2011 | Mullen et al. |
| 2011/0278364 A1 | 11/2011 | Mullen et al. |
| 2011/0282753 A1 | 11/2011 | Mullen et al. |
| 2011/0284632 A1 | 11/2011 | Mullen et al. |
| 2011/0284640 A1 | 11/2011 | Mullen et al. |
| 2012/0028702 A1 | 2/2012 | Mullen et al. |
| 2012/0037709 A1 | 2/2012 | Cloutier et al. |
| 2012/0197708 A1 | 8/2012 | Mullen et al. |
| 2012/0209744 A1 | 8/2012 | Mullen et al. |
| 2012/0218083 A1* | 8/2012 | Tuttle ........................ 340/10.1 |
| 2012/0254037 A1 | 10/2012 | Mullen |
| 2012/0286037 A1 | 11/2012 | Mullen et al. |
| 2012/0286928 A1 | 11/2012 | Mullen et al. |
| 2012/0318871 A1 | 12/2012 | Mullen et al. |
| 2012/0326013 A1 | 12/2012 | Cloutier et al. |
| 2013/0020396 A1 | 1/2013 | Mullen et al. |
| 2013/0282573 A1 | 10/2013 | Mullen et al. |
| 2013/0282575 A1 | 10/2013 | Mullen et al. |
| 2014/0054384 A1 | 2/2014 | Cloutier et al. |
| 2015/0186766 A1 | 7/2015 | Mullen et al. |
| 2016/0162713 A1 | 6/2016 | Cloutier et al. |
| 2016/0180209 A1 | 6/2016 | Mullen et al. |
| 2016/0239735 A1 | 8/2016 | Mullen et al. |
| 2016/0283837 A1 | 9/2016 | Mullen et al. |
| 2016/0307085 A1 | 10/2016 | Mullen et al. |
| 2016/0335529 A1 | 11/2016 | Mullen et al. |
| 2016/0342876 A1 | 11/2016 | Mullen et al. |
| 2016/0342877 A1 | 11/2016 | Mullen et al. |
| 2016/0342878 A1 | 11/2016 | Mullen et al. |
| 2016/0342879 A1 | 11/2016 | Mullen et al. |
| 2016/0342880 A1 | 11/2016 | Mullen et al. |
| 2017/0286817 A1 | 10/2017 | Mullen et al. |
| 2017/0300796 A1 | 10/2017 | Mullen et al. |
| 2018/0053079 A1 | 2/2018 | Cloutier et al. |
| 2018/0060881 A1 | 3/2018 | Mullen et al. |
| 2019/0042903 A1 | 2/2019 | Cloutier et al. |
| 2019/0065928 A1 | 2/2019 | Mullen et al. |
| 2019/0197387 A1 | 6/2019 | Mullen et al. |
| 2019/0340484 A1 | 11/2019 | Mullen et al. |
| 2020/0082383 A1 | 3/2020 | Mullen et al. |

* cited by examiner

SYSTEMS AND METHODS FOR CONTACTLESS COMMUNICATION MECHANISMS FOR CARDS AND MOBILE DEVICES

CROSS-REFERENCE TO RELATED APPLICATION

This application claims the benefit of U.S. Provisional Patent Application Nos. 61/484,547, titled "SYSTEMS AND DEVICES FOR MOBILE PAYMENT ACCEPTANCE," filed May 10, 2011, 61/484,566, titled "SYSTEMS AND METHODS FOR A MOBILE ELECTRONIC WALLET," filed May 10, 2011, 61/484,576, titled "SYSTEMS AND METHODS FOR MOBILE AUTHORIZATIONS," filed May 10, 2011, and 61/484,588, titled "SYSTEMS AND METHODS FOR CONTACTLESS COMMUNICATION MECHANISMS FOR CARDS AND MOBILE DEVICES," filed May 10, 2011 all of which are hereby incorporated by reference herein in their entirety.

BACKGROUND OF THE INVENTION

This invention relates to cards, mobile devices and related systems.

SUMMARY OF THE INVENTION

A card may include a dynamic magnetic communications device, which may take the form of a magnetic encoder or a magnetic emulator. A magnetic encoder, for example, may be utilized to modify information that is located on a magnetic medium, such that a magnetic stripe reader may then be utilized to read the modified magnetic information from the magnetic medium. A magnetic emulator, for example, may be provided to generate electromagnetic fields that directly communicate data to a read-head of a magnetic stripe reader. A magnetic emulator, for example, may communicate data serially to a read-head of the magnetic stripe reader. A magnetic emulator, for example, may communicate data in parallel to a read-head of the magnetic stripe reader.

All, or substantially all, of the front surface, as well as the rear surface, of a card may be implemented as a display (e.g., bi-stable, non bi-stable, LCD, or electrochromic display). Electrodes of a display may be coupled to one or more touch sensors, such that a display may be sensitive to touch (e.g., using a finger or a pointing device) and may be further sensitive to a location of the touch. The display may be sensitive, for example, to objects that come within a proximity of the display without actually touching the display.

A dynamic magnetic stripe communications device may be implemented on a multiple layer board (e.g., a two-layer flexible printed circuit board). A coil for each track of information that is to be communicated by the dynamic magnetic stripe communications device may then be provided by including wire segments on each layer and interconnecting the wire segments through layer interconnections to create a coil. For example, a dynamic magnetic stripe communications device may include two coils such that two tracks of information may be communicated to two different read-heads included in a read-head housing of a magnetic stripe reader. A dynamic magnetic communications device may include, for example, three coils such that three tracks of information may be communicated to three different read-heads included in a read-head housing of a magnetic stripe reader.

Input and/or output devices may be included on a card, for example, to facilitate data exchange with the card. For example, an integrated circuit (IC) may be included on a card and exposed from the surface of the card. Such a chip (e.g., an EMV chip) may communicate information to a chip reader (e.g., an EMV chip reader). A contactless device (e.g., one or more RFID antennas and one or more associated RFID chips) may be included in a card, for example, to exchange information with an RFID device.

One or more detectors may be provided in a card, for example, to sense the presence of an external object, such as a person or device, which in turn, may trigger the initiation of a communication sequence with the external object. The sensed presence of the external object may then be communicated to a processor of the card, which in turn may direct the exchange of information between a card and the external object. Accordingly, timing aspects of the information exchange between an external object and the various I/O devices provided on a card may also be determined by circuitry (e.g., a processor) provided on a card.

The sensed presence of the external object or device may include the type of object or device that is detected and, therefore, may then determine the type of communication that is to be used with the detected object or device. For example, a detected object may include a determination that the object is a read-head housing of a magnetic stripe reader. Such an identifying detection, for example, may activate a dynamic magnetic stripe communications device so that information may be communicated to the read-head of the magnetic stripe reader. Information may be communicated by a dynamic magnetic stripe communications device, for example, by re-writing magnetic information on a magnetic medium that is able to be read by a magnetic stripe reader or electromagnetically communicating data to the magnetic stripe reader.

As per another example, a detected object may include a determination that the object is an RFID enabled device. Such an identifying detection, for example, may cause RFID data to be communicated by a processor of a card to an RFID chip of a card. The RFID data may be temporarily contained within the RFID chip until the RFID data is communicated to a detected RFID device by an RFID antenna on the card. The RFID data may, for example, be erased from the RFID chip after being communicated to the RFID device.

A card may, for example, be an assembly of multiple printed circuit boards, electronics, one or more RFID antennas, and one or more associated RFID chips. An RFID antenna may, for example, be fabricated on one printed circuit board and an associated RFID chip may, for example, be attached to a separate printed circuit board. Communications (e.g., RFID data transfer between the RFID chip and the RFID antenna) may, for example, be transferred between separate printed circuit boards via conductive paths established between the separate printed circuit boards. An RFID antenna and an associated RFID chip may, for example, reside on the same printed circuit board so as to reduce a number of conductive traces that may be required between separate printed circuit boards.

A card assembly may, for example, be laminated such that all printed circuit boards, electronic circuitry and components are covered in a polymer. For example, an electronics package may be provided between two layers of polymer and a liquid polymer may be introduced between these layers and hardened to form a card. A laminated card assembly may, for example, be devoid of electrical contacts on either surface of the laminated card. A laminated card assembly may, for example, provide electrical contacts (e.g., EMV chip contacts) on one or more surfaces of a laminated card assembly.

A mobile device, such as a laptop computer, a mobile telephonic device (e.g., a cellular phone), a PDA, an MP3 player, or a positioning device (e.g., a GPS) may include one or more RFID antennas and associated RFID chips. Accordingly, for example, any mobile device may establish an RFID communication channel with any other RFID enabled device (e.g., an RFID enabled card). A computing device, such as a desktop computer, may be an RFID enabled device. Accordingly, for example, any RFID enabled device (e.g., an RFID enabled card or an RFID enabled mobile device) may establish an RFID communication channel with any RFID enabled computing device.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
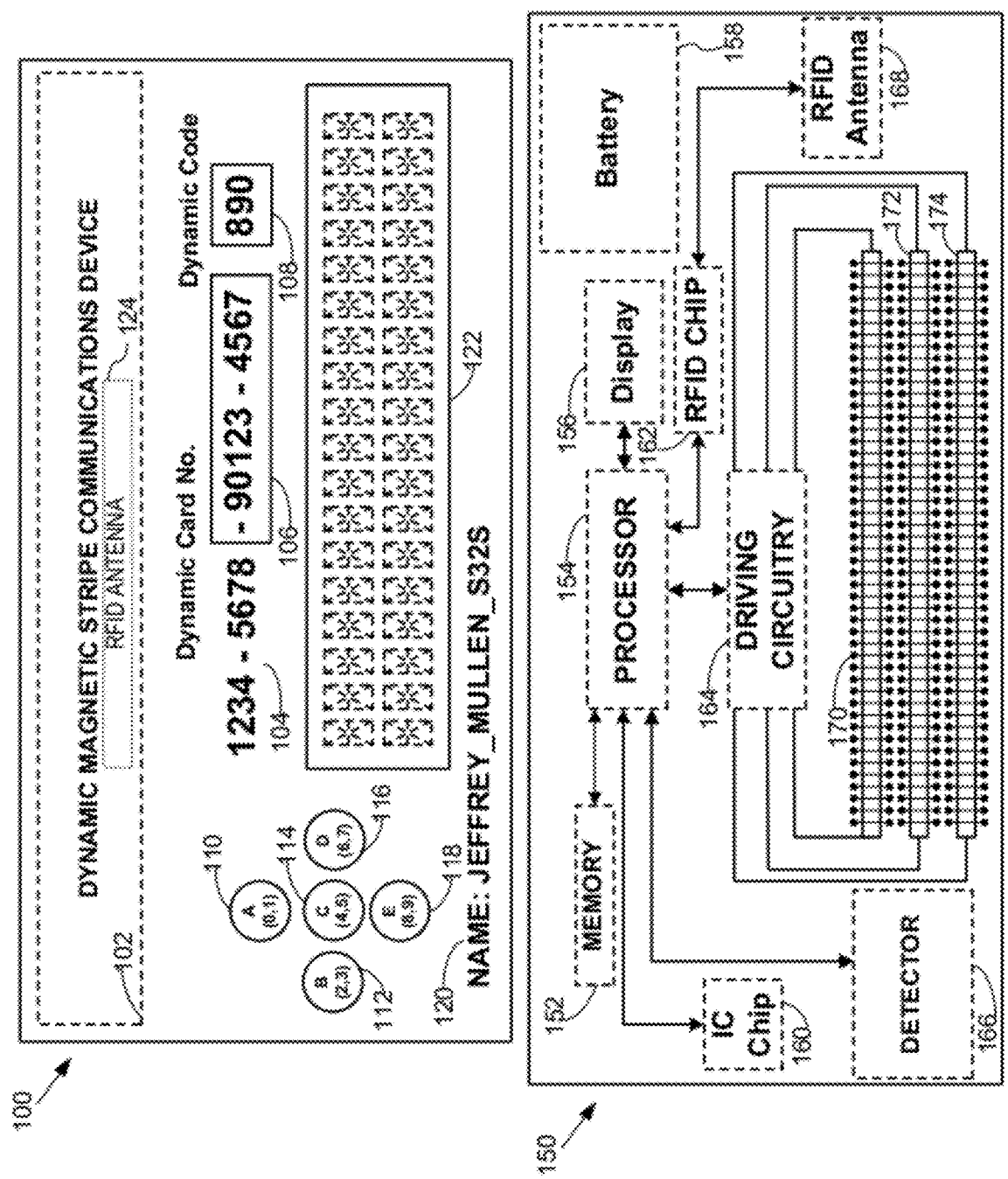
FIG. 1 is an illustration of cards constructed in accordance with the principles of the present invention.

FIG. 1 shows card 100 that may include, for example, a dynamic number that may be entirely, or partially, displayed using a display (e.g., display 106). A dynamic number may include a permanent portion such as, for example, permanent portion 104 and a dynamic portion such as, for example, dynamic portion 106. Card 100 may include a dynamic number having permanent portion 104 and permanent portion 104 may be incorporated on card 100 so as to be visible to an observer of card 100. For example, labeling techniques, such as printing, embossing, laser etching, etc., may be utilized to visibly implement permanent portion 104.

Card 100 may include a second dynamic number that may be entirely, or partially, displayed via a second display (e.g., display 108). Display 108 may be utilized, for example, to display a dynamic code such as a dynamic security code.

Card 100 may also include third display 122 that may be used to display graphical information, such as logos and barcodes. Third display 122 may also be utilized to display multiple rows and/or columns of textual and/or graphical information.

Persons skilled in the art will appreciate that any one or more of displays 106, 108, and/or 122 may be implemented as a bi-stable display. For example, information provided on displays 106, 108, and/or 122 may be stable in at least two different states (e.g., a powered-on state and a powered-off state). Any one or more of displays 106, 108, and/or 122 may be implemented as a non-bi-stable display. For example, the display is stable in response to operational power that is applied to the non-bi-stable display. Other display types, such as LCD or electro-chromic, may be provided as well.

Other permanent information, such as permanent information 120, may be included within card 100, which may include user specific information, such as the cardholder's name or username. Permanent information 120 may, for example, include information that is specific to card 100 (e.g., a card issue date and/or a card expiration date). Information 120 may represent, for example, information that includes information that is both specific to the cardholder as well as information that is specific to card 100.

Card 100 may accept user input data via any one or more data input devices, such as buttons 110-118. Buttons 110-118 may be included to accept data entry through mechanical distortion, contact, or proximity. Buttons 110-118 may be responsive to, for example, induced changes and/or deviations in light intensity, pressure magnitude, or electric and/or magnetic field strength. Such information exchange may then be determined and processed by a processor of card 100 as data input. An RFID chip may, for example, include memory that may be populated with data to be communicated via RFID antenna 124 when one or more buttons 110-118 are pressed. Accordingly, for example, once a button is pressed, RFID data may be loaded into an RFID chip memory and once an RFID communication channel is formed (e.g., once card 100 is brought within an RFID communication distance of an RFID enabled device) the data in RFID chip memory may be communicated via an RFID communication channel using RFID antenna 124. Once RFID data is communicated, or after a configurable delay period, the RFID chip memory may be erased.

FIG. 1 shows architecture 150, which may include one or more processors 154. One or more processors 154 may be configured to utilize external memory 152, internal memory of processor 154, internal memory of RFID chip 162, or a combination of external memory 152, internal memory of RFID chip 162, and internal memory of processor 154 for dynamically storing information, such as executable machine language, related dynamic machine data, RFID data and user input data values.

One or more of the components shown in architecture 150 may be configured to transmit information to processor 154 and/or may be configured to receive information as transmitted by processor 154. For example, one or more displays 156 may be coupled to receive data from processor 154. The data received from processor 154 may include, for example, at least a portion of dynamic numbers and/or dynamic codes. The data to be displayed on the display may be displayed on one or more displays 156.

One or more displays 156 may be, for example, touch sensitive and/or proximity sensitive. For example, objects such as fingers, pointing devices, etc., may be brought into contact with displays 156, or in proximity to displays 156. Detection of object proximity or object contact with displays

156 may be effective to perform any type of function (e.g., transmit data to processor 154). Displays 156 may have multiple locations that are able to be determined as being touched, or determined as being in proximity to an object.

Persons skilled in the art will appreciate that a card (e.g., card 100 of FIG. 1) may, for example, be a self-contained device that derives its own operational power from one or more batteries 158. Furthermore, one or more batteries 158 may be included, for example, to provide operational power for a period of time (e.g., approximately 2-4 years). One or more batteries 158 may be included, for example, as rechargeable batteries.

Input and/or output devices may be implemented on architecture 150. For example, integrated circuit (IC) chip 160 (e.g., an EMV chip) may be included on architecture 150 to communicate information to a chip reader (e.g., an EMV chip reader) via contacts that may be formed on a surface of a card (e.g., card 100 of FIG. 1). Other input and/or output devices may be included on architecture 150, for example, to provide any number of input and/or output capabilities within architecture 150. For example, other input and/or output devices may include an audio device capable of receiving and/or transmitting audible information. Other input and/or output devices may include a device that exchanges analog and/or digital data using a visible data carrier. Alternately, for example, other input and/or output devices may include a device that is sensitive to a non-visible data carrier, such as an infrared data carrier or electromagnetic data carrier.

A dynamic magnetic stripe communications device may be included within architecture 150 to communicate information to, for example, a read-head of a magnetic stripe reader via, for example, electromagnetic signals. For example, electromagnetic field generators 170-174 may be included to communicate one or more tracks of electromagnetic data to read-heads of a magnetic stripe reader. Electromagnetic field generators 170-174 may include, for example, a series of electromagnetic elements, where each electromagnetic element may be implemented as a coil wrapped around one or more materials (e.g., a magnetic material and/or a non-magnetic material). Additional materials may be placed outside the coil (e.g., a magnetic material and/or a non-magnetic material).

Electrical excitation by processor 154 of one or more coils of one or more electromagnetic elements via, for example, driving circuitry 164 may be effective to generate electromagnetic fields from one or more electromagnetic elements. One or more electromagnetic field generators 170-174 may be utilized to communicate electromagnetic information to, for example, one or more read-heads of a magnetic stripe reader.

Timing aspects of information exchange between architecture 150 and the various I/O devices implemented on architecture 150 may be determined by processor 154. Detector 166 may be utilized, for example, to sense the proximity and/or actual contact, of an external device, which in turn, may trigger the initiation of a communication sequence. The sensed presence and/or touch of the external device may then be communicated to a controller (e.g., processor 154), which in turn may direct the exchange of information with the external device. The sensed presence and/or touch of the external device may be effective to, for example, determine the type of device or object detected.

For example, the detection may include the detection of, for example, a read-head of a magnetic stripe reader. In response, processor 154 may activate one or more electromagnetic field generators 170-174 to initiate a communications sequence with, for example, one or more read-heads of a magnetic stripe reader. The timing relationships associated with communications between one or more electromagnetic field generators 170-174 and one or more read-heads of a magnetic stripe reader may be provided through use of the detection of the magnetic stripe reader.

Persons skilled in the art will appreciate that processor 154 may provide user-specific and/or card-specific information through utilization of any one or more of buttons 110-118, RFID chip 162, RFID antenna 168, IC chip 160, electromagnetic field generators 170-174, and any other input and/or output device. RFID antenna 168 may, for example, be brought within a communication distance of an RFID enabled device which may be generating a carrier field (e.g., an RF field). In so doing, RFID antenna 168 may collect energy from the RF field which may then be detected by RFID chip 162. RFID chip 162 may, for example, communicate a presence of an RFID communication device to processor 152. Processor 152 may, in turn, populate a memory of RFID chip 162 with user-specific and/or card-specific information (e.g., a payment account number, cardholder name, and a dynamic security code) that may then be communicated to the RFID enabled device via RFID antenna 168.

RFID antenna 168 may be configured to receive data from an RFID device (e.g., an RFID tag). Accordingly, for example, RFID chip 162 may interrogate the capabilities of an RFID device and may receive data from the RFID device upon a determination that the RFID device may communicate data. RFID antenna 168 may, for example, be provided as two or more RFID antennas that may be used to enhance RFID data communication and/or reception with an RFID enabled device.

Figure 2:
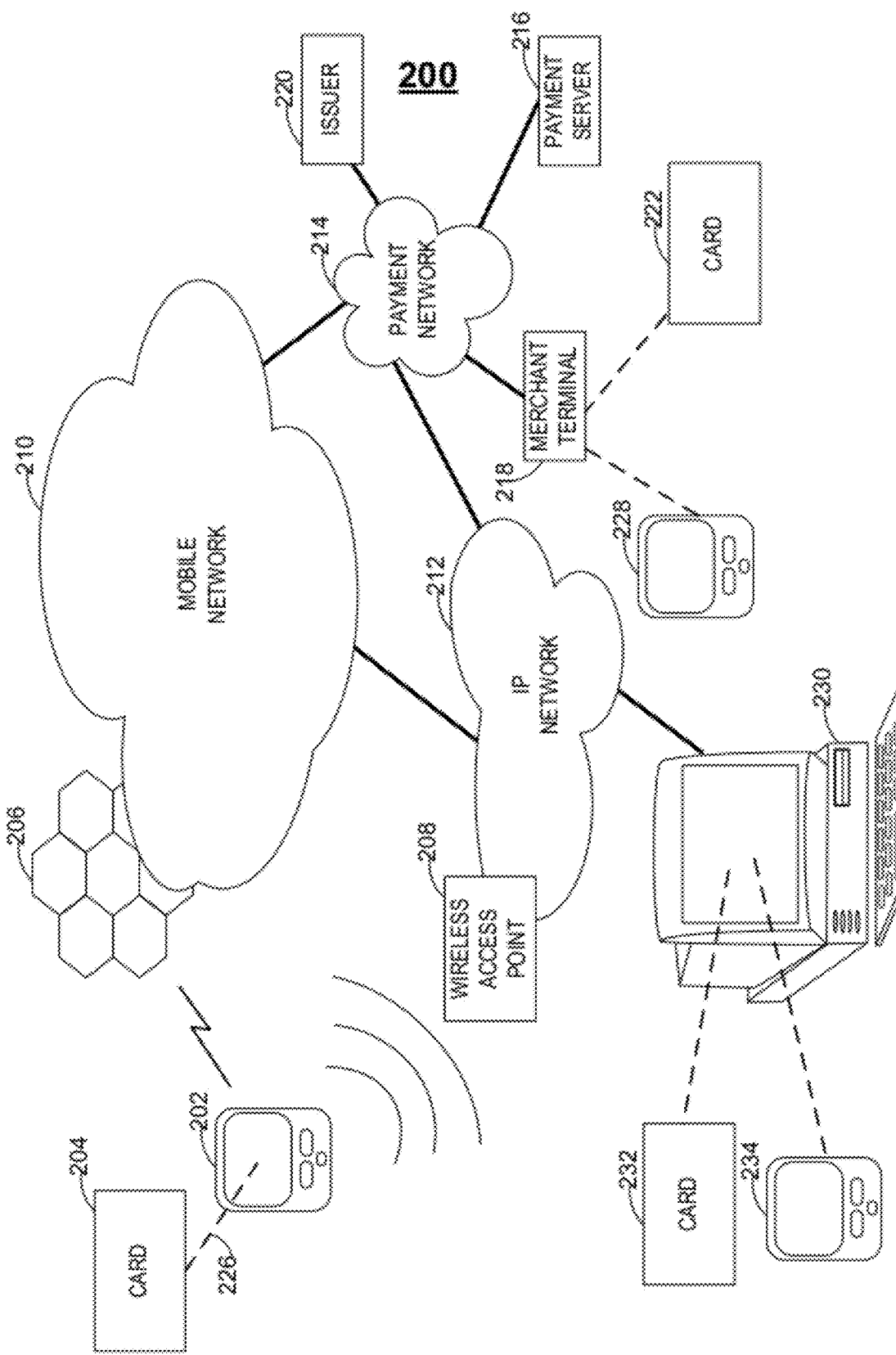
FIG. 2 is an illustration of a network topology constructed in accordance with the principles of the present invention.

FIG. 2 shows network topology 200 that may include, for example, mobile device 202 (e.g., a mobile telephonic device, a PDA, an electronic tablet, a laptop, a GPS unit, or an MP3 player). Mobile device 202 may, for example, include a contactless interface that may initiate, sustain, and/or terminate communication channel 226 between card 204 and mobile device 202. Card 204 and mobile device 202 may communicate via channel 226 via a contactless communication medium (e.g., an RF medium).

Mobile device 202 may provide one or more transceivers that may communicate with one or more wired networks (e.g., IP network 212 and/or payment network 214) and/or one or more wireless networks (e.g., mobile network 210). Mobile device 202 may, for example, communicate with a cellular station over a wireless radio interface (e.g., a GSM air interface) that may be used by mobile device 202 to communicate information (e.g., voice and data) to cellular network access infrastructure 206 (e.g., one or more GSM base transceiver stations, base station controllers, and mobile switching centers). Persons skilled in the art will appreciate that cellular network access infrastructure 206 may utilize any multiple access architecture, such as for example, a code-division multiple access architecture and/or a time-division multiple access architecture.

Mobile device 202 may, for example, communicate with wireless access point 208 over a wireless interface (e.g., a Bluetooth interface or a Wi-Fi interface). Accordingly, for example, mobile device 202 may access one or more wired networks (e.g., IP network 212 and/or payment network 214) and/or one or more wireless networks (e.g., mobile network 210) without the need to first gain access to cellular network access infrastructure 206.

Card 204 may, for example, be a powered card or a non-powered card (e.g., a powered payment card or a non-powered payment card). Accordingly, for example, payment information (e.g., a payment account number and a card expiration date) may be communicated from card 204 to mobile device 202 in support of a financial transaction being conducted by mobile device 202. In so doing, for example, items for purchase on IP network 212 (e.g., the internet) may be accessed by a browser of mobile device 202 via an access point (e.g., wireless access point 208 or cellular network access infrastructure 206). Mobile device 202 may, for example, complete a purchase transaction by first obtaining required payment information from card 204 and then communicating such payment information to network entities (e.g., payment server 216 and/or issuer 220).

Payment server 216 may, for example, contact issuer 220 via a network (e.g., payment network 214) with payment information received from mobile device 202 for authorization of a purchase. Once authorized, payment transaction information may be recorded onto a receipt that may be delivered to mobile device 202 via any one or more delivery options (e.g., via a short messaging service of mobile network 210 or an email delivery service of IP network 212). Mobile device 202 may allow a user to associate purchase categories (e.g., groceries, auto repair, or entertainment) to purchases transacted by the mobile device so that the user may receive a more detailed accounting of his or her expenditures on his or her receipt. Accordingly, for example, a user may enjoy a higher degree of integration such that a user may customize a level of detail provided on a receipt via mobile device 202. A payment receipt may, for example, be provided to mobile device 202 as a proof-of-purchase object (e.g., a barcode) that may be provided to a display of mobile device 202 and read by other computing equipment (e.g., a barcode scanner) for proof-of-purchase confirmation.

A device (e.g., mobile device 228 and/or card 222) may, for example, include a contactless communication device (e.g., an RFID device) that may initiate, sustain, and/or terminate a contactless communication channel (e.g., an RFID communications channel) with merchant terminal 218. Accordingly, for example, card 222 and/or mobile device 228 may communicate payment information to merchant terminal 218 to complete a financial transaction. In so doing, for example, mobile device 228 and/or card 222 may first receive a request from a user to communicate payment information to merchant terminal 218.

As per an example, a user of card 222 may press a button on card 222 that may cause payment information to be transferred to a memory of a processor (e.g., an RFID chip). An associated RFID antenna may, for example, sense the presence of merchant terminal 218 by detecting an RF carrier field that may be generated by an RFID device of merchant terminal 218. Once the presence of merchant terminal 218 is sensed, payment information may be transferred from an RFID chip of card 222 to an RFID antenna of card 222 to communicate the payment information via an RFID communication channel to merchant terminal 218 to complete a financial transaction.

As per another example, card 222 may be a non-powered card (e.g., a non-powered payment card). Accordingly, for example, card 222 may include an RFID chip and associated RFID antenna that may be brought within proximity to merchant terminal 218. An RFID antenna of card 222 may sense an RF carrier field generated by merchant terminal 218 and may derive operational power from the RF carrier field. The operational power may, for example, be collected by an RFID antenna of card 222 and provided to an associated RFID chip of card 222 in order to energize the RFID chip of card 222. Once energized, an RFID chip of card 222 may modulate an RF carrier field generated by merchant terminal 218 to, for example, communicate payment information from card 222 to merchant terminal 218 to complete a purchase transaction.

Any computing device (e.g., desktop computer 230) may, for example, provide contactless communication electronics (e.g., an RFID reader) that may communicate with a contactless communication device (e.g., card 232 and/or mobile device 234). Accordingly, for example, any information that may be communicated by card 232 (e.g., payment information) may be received by computing device 230 (e.g., received via an RFID communication channel established between card 232 and computing device 230) and forwarded onto a network entity (e.g., issuer 220 and/or payment server 216) to complete a purchase transaction. Persons skilled in the art will appreciate that any RFID information may be exchanged between computing device 230 and an RFID enabled device (e.g., card 232 and/or mobile device 234).

Figure 3:
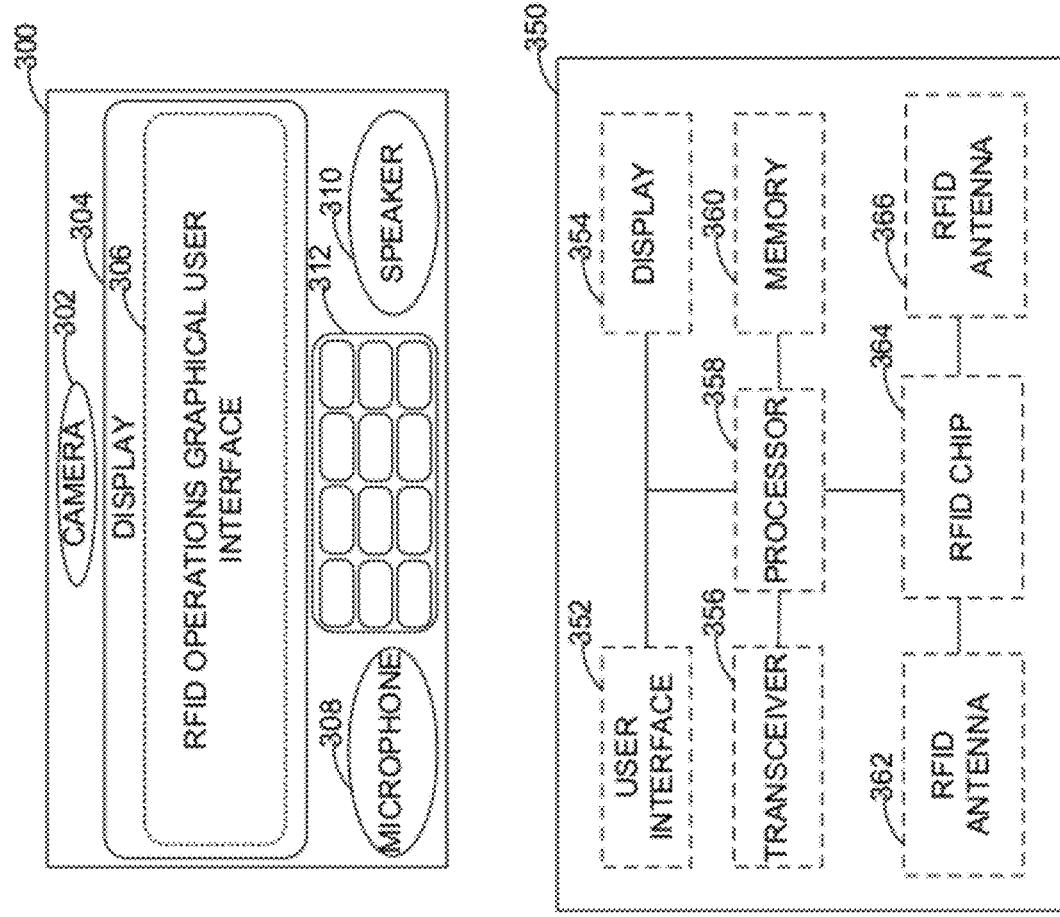
FIG. 3 is an illustration of mobile devices constructed in accordance with the principles of the present invention.

FIG. 3 shows mobile device 300. Mobile device 300 may be any mobile device, such as a mobile telephonic device (e.g., cell phone), a PDA, an electronic tablet, an MP3 player, or a locating device (e.g., a GPS device). Accordingly, mobile device 300 may be operated in a mobile environment while a user of mobile device 300 goes about his or her daily activities (e.g., driving, shopping, walking, dining, and exercising). In addition, for example, mobile device 300 may perform multiple functions simultaneously (e.g., a person may carry on a conversation while at the same time browsing and purchasing products on the Internet).

Mobile device 300 may include audio processing devices (e.g., microphone 308 and speaker 310). Accordingly, for example, mobile device 300 may receive voice commands from a user via microphone 308 and may process such commands to perform a function. For example, a user may place mobile device 300 into a desired operational mode by speaking a command into microphone 308 that is associated with the desired operational mode. In so doing, for example, mobile device 300 may engage in hands-free operation by receiving voice commands via microphone 308 and performing functions associated with the received voice commands.

Mobile device 300 may receive data input via microphone 308. For example, a voice-band modem may generate signals in a voice-band frequency range that may be received by microphone 308. A processor of mobile device 300 may interpret the received audible information as data signals and may process the data signals as, for example, data values and/or control data input.

Mobile device 300 may include camera 302. Camera 302 may capture one or more frames of video data and store the video data within a memory of mobile device 300. Accordingly, for example, a processor of mobile device 300 may receive one or more frames of video information via camera 302 and may process the video information as data values and/or control data input. In so doing, for example, mobile device 300 may receive optical information that is sensed by camera 302 during a series of one or more video capture events that produce one or more frames of video information. The one or more frames of video information may contain one or more data elements (e.g., pixels) having properties (e.g., color, intensity, or contrast) that may be interpreted by a processor of mobile device 300 as data values and/or control data.

Mobile device 300 may include manual input interface 312. Manual input interface 312 may, for example, include keys and/or buttons that may be sensitive to manual input, such as a touch or an application of pressure. Accordingly, for example, a user of mobile device 300 may enter information into mobile device 300 via manual interface 312 to cause a processor of mobile device 300 to enter a particular mode of operation. Manual interface 312 may, for example, be used for data entry (e.g., dialing a phone number or entering data as may be requested by mobile device 300) during a particular mode of operation of mobile device 300.

Mobile device 300 may include display 304. Display 304 may provide visible information that may be utilized by a user during interaction with mobile device 300. A portion or all of display 304 may be touch sensitive such that objects making contact with display 304 or objects coming within a proximity of display 304 may be detected by a processor of mobile device 300. Accordingly, for example, RFID operations graphical user interface 306 may be provided by display 304 so that graphical information may be displayed to solicit and/or receive data entry from a user. In so doing, for example, touch-sensitive graphical user interface devices such as radio buttons, textual input boxes, virtual buttons, pull-down menus, and navigational tools may be used for data entry to initiate, change, and/or support functions performed by mobile device 300.

FIG. 3 shows architecture 350. User interface 352 may, for example, be included within architecture 350 to allow user interaction with architecture 350. For example, a dedicated key pad or keyboard may be included within user interface 352 to allow alphanumeric data entry into architecture 350.

Architecture 350 may include one or more displays 354. Display 354 may, for example, be touch-sensitive. Accordingly, for example, display 354 may be utilized for alphanumeric data entry using virtual buttons that may be rendered onto touch-sensitive portions of display 354. In so doing, for example, touching virtual buttons that may be associated with alphabetic and numeric characters of display 354 may be detected by processor 358 as alphanumeric data entry.

Alphanumeric entry boxes may, for example, be rendered onto display 354. A user may, for example, activate a cursor within such an alphanumeric entry box by touching an area within the alphanumeric entry box. A user may utilize user interface 352 and/or a virtual keypad rendered onto display 354 to select alphanumeric characters to be placed within the alphanumeric entry box in accordance with a character position identified by an activated cursor within the alphanumeric entry box. In so doing, for example, processor 358 may receive alphanumeric characters as typed into a alphanumeric entry box of display 354 and may use such alphanumeric characters as data input.

Display 354 may, for example, provide data output from architecture 350. For example, display 354 may communicate data using a series of light pulses. Accordingly, for example, processor 358 may cause one or more portions of display 354 to produce light pulses having varying characteristics (e.g., duration, intensity, and frequency) that may communicate information via such light pulses. In so doing, for example, a device that may be sensitive to light pulses may receive information communicated by display 354 via light pulses having varying characteristics. Display 354 may, for example, communicate data using visual information that may be substantially static (e.g., a barcode).

Architecture 350 may include one or more transceivers 356. Transceiver 356 may communicate information to and/or may receive information from one or more devices. Transceiver 356 may, for example, communicate via a wireless interface with one or more cellular stations of a mobile network. Accordingly, for example, transceiver 356 may allow a mobile device (e.g., mobile device 300 of FIG. 3) to establish a communications channel with an associated cellular station. In so doing, for example, a mobile device (e.g., mobile device 300 of FIG. 3) may exchange information (e.g., voice, text, data, or multimedia) with one or more terrestrial networks (e.g., the internet or a payment network) via an associated cellular station. As per another example, transceiver 356 may exchange information with one or more other mobile devices via one or more associated cellular stations.

Transceiver 356 may, for example, communicate via a wireless interface with one or more mobile devices directly. Accordingly, for example, transceiver 356 may communicate with another mobile device without first accessing a mobile network via a cellular station of the mobile network. As per another example, transceiver 356 may, for example, communicate via a wireless interface with one or more network devices (e.g., a wireless access point) directly. Accordingly, for example, a mobile device (e.g., mobile device 300 of FIG. 3) may directly connect to a wired and/or a wireless network via any one or more wireless standards (e.g., Bluetooth or Wi-Fi) to exchange information with other devices that may be connected to the wired and/or wireless network. In so doing, for example, a wired and/or wireless network may be accessed by a mobile device without first accessing a mobile network via a cellular station of a mobile network.

Architecture 350 may include RFID chip 364, RFID antenna 362, and optional RFID antenna 366 which may combine to communicate with an RFID enabled device via an RFID communication channel. Accordingly, for example, architecture 350 may be compatible with any RFID device, such as for example, an RFID enabled card, an RFID reader, and an RFID enabled computing device (e.g., an RFID enabled desktop computer). RFID antenna 366 may, for example, be provided to enhance RFID data communication and/or reception.

RFID antenna 362 and/or RFID antenna 366 may, for example, establish an RF carrier field that may be modulated by an RFID device (e.g., an RFID tag of a non-powered payment card). In so doing, for example, an RFID tag of a non-powered payment card may derive operational power from an RF field provided by RFID antenna 362 and/or RFID antenna 366 and may communicate information (e.g., one, two, and/or three tracks of magnetic stripe data) to RFID antenna 362 and/or RFID antenna 366 by modulating the RF field produced by RFID antenna 362 and/or RFID antenna 366.

A powered card may, for example, communicate with RFID antenna 362 and/or RFID antenna 366. A powered card may, for example, include a processor, a battery, a memory, a wireless communications device (e.g., a powered RFID device) and other electronics (e.g., buttons) that may allow a user to interact with the powered card to perform one or more functions. Accordingly, for example, a powered card may be used to communicate specific information to RFID antenna 362 and/or RFID antenna 366 by selective interaction with the buttons of the powered card. In so doing, for example, a powered card may be used to interactively communicate magnetic stripe information (e.g., one, two, and/or three tracks of magnetic stripe data) to RFID antenna 362 and/or RFID antenna 366 by sending a signal to a processor of a powered card (e.g., by pressing a button on the powered card) to initiate such communications.

RFID chip 364 may, for example, receive RFID data from processor 358 and may store such RFID data temporarily. Accordingly, for example, once an RFID communication channel is formed with an RFID enabled device, RFID data contained within RFID chip 364 may be communicated to the RFID enabled device via RFID antenna 362 and/or RFID antenna 366. RFID antennas 362 and 366 may, for example, communicate the same RFID data to an RFID enabled device. RFID antennas 362 and 366 may, for example, communicate different RFID data sets to an RFID enabled device and the differences between the RFID data sets communicated may provide multiple other channels of data that may be communicated (e.g., an amplitude difference between RFID data sets may be an RFID data channel and a phase difference between RFID data sets may be an additional RFID data channel).

Architecture 350 may include memory 360 and/or processor 358 may include internal memory. Accordingly, for example, application code may be stored within memory 360 and/or processor 358 and executed by processor 358 in support of functions performed by architecture 350. For example, an application (e.g., a graphical user interface) may be executed by processor 358 and displayed onto display 354, which may be used to interact with a user of a mobile device (e.g., mobile device 300 of FIG. 3). Persons skilled in the art will appreciate that executable application code may be communicated to architecture 350 via any one or more interfaces of architecture 350 (e.g., user interface 352, display 354, transceiver 356, and/or RFID antennas 362 and/or 366).

Application data (e.g., payment data) may be temporarily stored within RFID chip 364 and communicated by RFID antenna 362 and/or RFID antenna 366 during operation. For example, payment data may be temporarily communicated to RFID chip 364 by processor 358 during a financial transaction being conducted via an RFID communication channel between a mobile device (e.g., mobile device 300 of FIG. 3) and another RFID device (e.g., a merchant terminal). Once RFID data is communicated (or after a configurable delay period has expired), processor 358 may cause the payment data stored within RFID chip 364 to be erased so as to reduce an ability of an RFID skimmer to access data from RFID chip 364.

Figure 4:
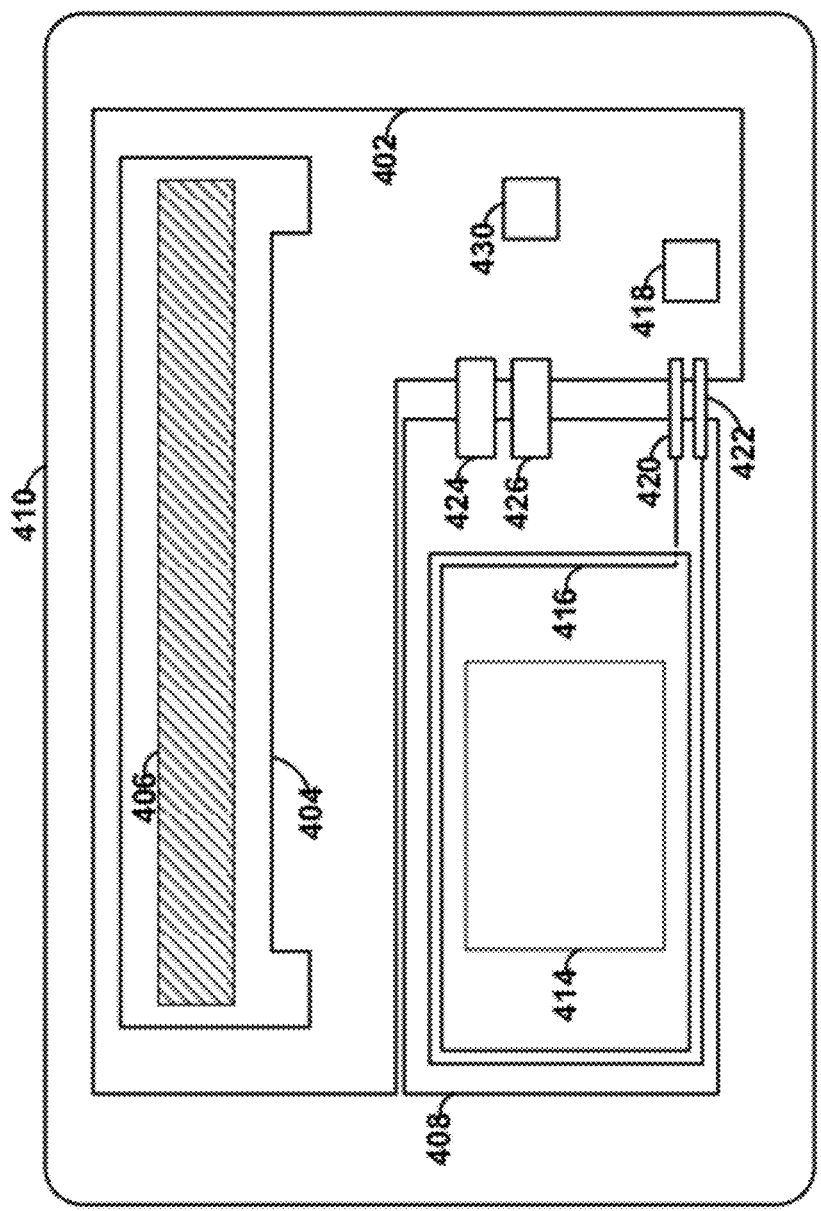
FIG. 4 is an illustration of a card constructed in accordance with the principles of the present invention.

FIG. 4 shows card 400, which may be a powered card and may include, for example, board 402, board 404, dynamic magnetic communications device 406, RFID chip 418, board 408, battery 414, conductive leads 420-426 and RFID antenna 416. Additional circuitry may be provided on board 402, which may include, for example, processor 430, an EMV chip, a display, a display driver, driver circuitry for dynamic magnetic stripe communications device 406, light emitting diodes, light sensors, infrared sensors and transmitters, capacitive sensing contacts, and a user interface (e.g., one or more buttons).

All boards, circuitry, and other components of card 400 may be laminated to form card assembly 410. Such a lamination may, for example, be implemented using a series of lamination process steps, such that an electronics package containing boards 402, 404, and/or 408 and associated electronics may be encapsulated by an injection molding process (e.g., a reaction injection molding process), whereby a silicon-based material or a polyurethane-based material may be injected and cured (e.g., using temperature and/or chemical reaction) to form the electronics package. The electronics package may then be sandwiched between layers of laminate (e.g., layers of polymer laminate). Accordingly, for example, both surfaces of card assembly 410 may be formed by a layer of laminate such that no electrical contacts exist on either surface of card assembly 410. Alternately, for example, a surface of card assembly 410 may be formed by a layer of laminate such that electrical contacts may exist on a surface of card assembly 410 to provide connectivity from a surface of card assembly 410 to a processor (e.g., an EMV chip) of card 400.

RFID antenna 416 may, for example, be formed using an additive technique, whereby patterns of a conductive element (e.g., copper) may be applied to a PCB substrate (e.g., applied to either side of board 408) according to a patterning mask definition layer. RFID antenna 416 may, for example, be formed using a subtractive technique whereby patterns of a conductive element (e.g., copper) may be removed from a pre-plated PCB substrate (e.g., removed from either side of board 408) according to an etching mask definition layer. Other non-PCB fabrication techniques may be used to implement RFID antenna 416 as may be required by a particular application.

Conductive leads 420 and 422 may, for example, provide electrical conductivity between board 408 and board 402. Accordingly, for example, RFID data signals received by RFID antenna 416 may be communicated to RFID chip 418 via conductive leads 420 and 422. RFID data signals to be communicated by RFID antenna 416 (e.g., RFID data signals provided to RFID chip 418 via processor 430) may, for example, be received from RFID chip 418 via conductive leads 420 and 422. Conductive leads 424 and 426 may, for example, provide electrical conductivity between board 408 and board 402 so that operational power may be provided to the active electrical components that may exist on board 402 from battery 414. Conductive leads 420-426, for example, may use conductive adhesive, soldering paste, or any other type of conductive applications to provide electrical conductivity between boards 408 and 402.

Figure 5:
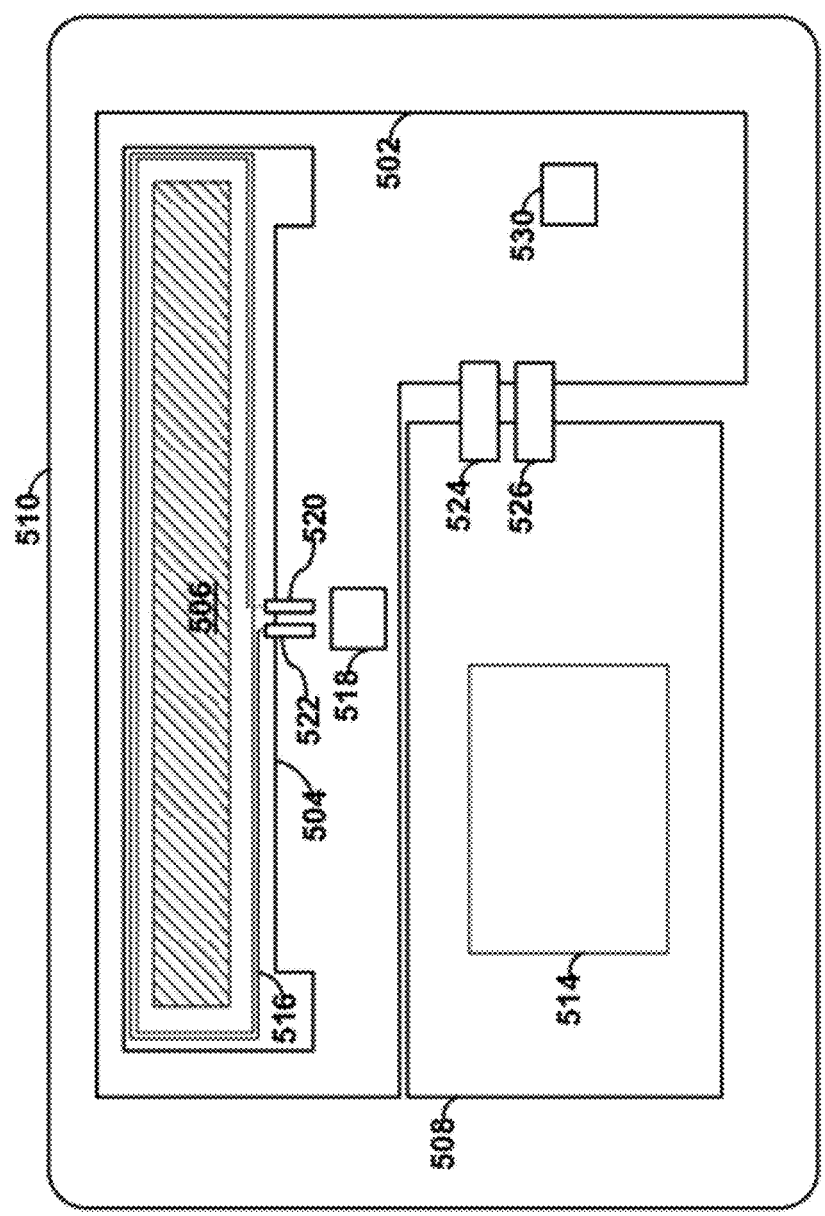
FIG. 5 is an illustration of a card constructed in accordance with the principles of the present invention.

FIG. 5 shows card 500, which may be a powered card and may include, for example, board 502, board 504, dynamic magnetic communications device 506, RFID chip 518, board 508, battery 514, conductive leads 520-526 and RFID antenna 516. Additional circuitry may be provided on board 502, which may include, for example, processor 530, an EMV chip, a display, a display driver, driver circuitry for dynamic magnetic stripe communications device 506, light emitting diodes, light sensors, infrared sensors and transmitters, capacitive sensing contacts, and a user interface (e.g., one or more buttons). All boards, circuitry, and other components of card 500 may, for example, be encapsulated by an injection molding process and sandwiched between two layers of laminate to form card assembly 510 having no exposed contacts. Alternately, for example, a surface of card assembly 510 may be formed by a layer of laminate such that electrical contacts may exist on a surface of card assembly 510 to provide connectivity from a surface of card assembly 510 to a processor (e.g., an EMV chip) of card 500.

RFID antenna 516 may, for example, be formed using additive and/or subtractive techniques to define patterns of a conductive element (e.g., copper) to form RFID antenna 516 (e.g., on either side of board 504). Conductive leads 520 and 522 may, for example, provide electrical conductivity between board 504 and board 502. Accordingly, for example, RFID data signals received by RFID antenna 516 may be communicated to RFID chip 518 via conductive leads 520 and 522. RFID data signals to be communicated by RFID antenna 516 (e.g., as may be provided to RFID chip 518 by processor 530) may be received from RFID chip 518 via conductive leads 520 and 522. Conductive leads 524 and 526 may, for example, provide electrical conductivity between board 508 and board 502 so that operational power may be provided to the active electrical components that may exist on board 502 from battery 514.

Figure 6:
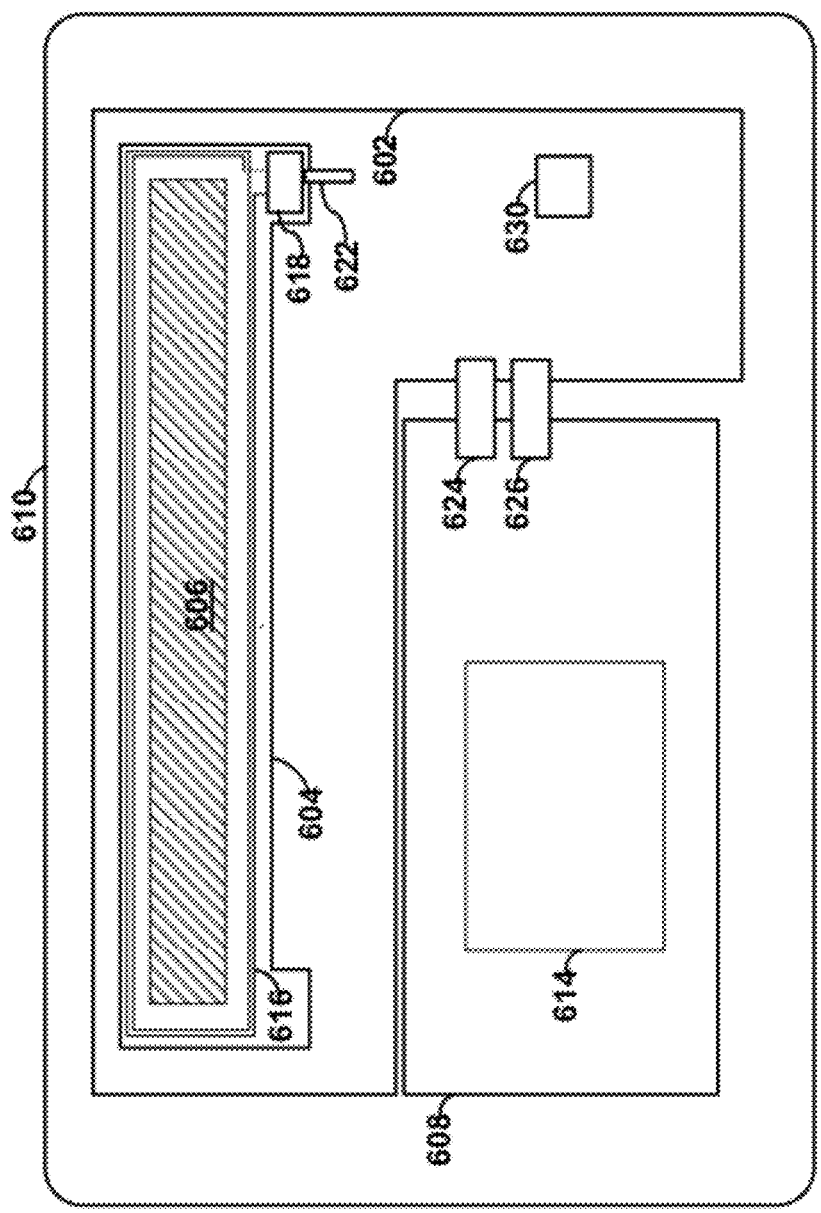
FIG. 6 is an illustration of a card constructed in accordance with the principles of the present invention.

FIG. 6 shows card 600, which may be a powered card and may include, for example, board 602, board 604, dynamic magnetic communications device 606, RFID chip 618, board 608, battery 614, conductive leads 622-626 and RFID antenna 616. Additional circuitry may be provided on board 602, which may include, for example, processor 630, an EMV chip, a display, a display driver, driver circuitry for dynamic magnetic stripe communications device 606, light emitting diodes, light sensors, infrared sensors and transmitters, capacitive sensing contacts, and a user interface (e.g., one or more buttons). All boards, circuitry, and other components of card 600 may, for example, be encapsulated by an injection molding process and sandwiched between two layers of laminate to form card assembly 610 having no exposed contacts. Alternately, for example, a surface of card assembly 610 may be formed by a layer of laminate such that electrical contacts may exist on a surface of card assembly 610 to provide connectivity from a surface of card assembly 610 to a processor (e.g., an EMV chip) of card 600.

RFID antenna 616 may, for example, be formed using additive and/or subtractive techniques to define patterns of a conductive element (e.g., copper) to form RFID antenna 616 (e.g., on either side of board 604). One or more conductive leads 622 may, for example, provide electrical conductivity between RFID chip 618 of board 604 and processor 630 of board 602. Accordingly, for example, while data exchanged between RFID chip 618 and RFID antenna 616 may remain on board 604, one or more conduction paths 622 may be provided so that data that is to be communicated by RFID antenna 616 may first be communicated to RFID chip 618 by processor 630 that may exist, for example, on board 602. Conductive leads 624 and 626 may, for example, provide electrical conductivity between board 608 and board 602 so that operational power may be provided to the active electrical components that may exist on boards 602 and 604 from battery 614.

Figure 7:
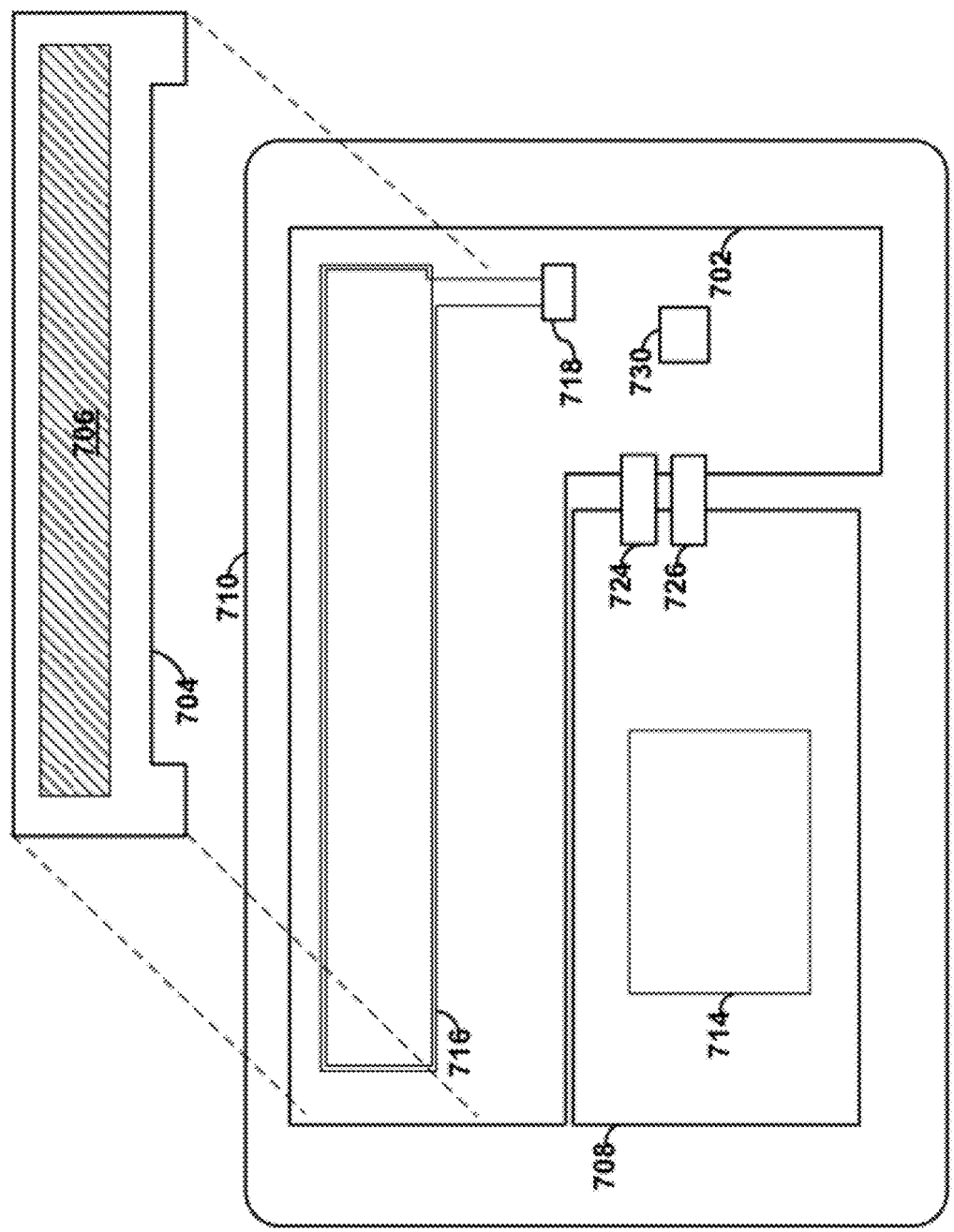
FIG. 7 is an illustration of a card constructed in accordance with the principles of the present invention.

FIG. 7 shows card 700, which may be a powered card and may include, for example, board 702, board 704, dynamic magnetic communications device 706, RFID chip 718, board 708, battery 714, conductive leads 724-726 and RFID antenna 716. Additional circuitry may be provided on board 702, which may include, for example, processor 730, an EMV chip, a display, a display driver, driver circuitry for dynamic magnetic stripe communications device 706, light emitting diodes, light sensors, infrared sensors and transmitters, capacitive sensing contacts, and a user interface (e.g., one or more buttons). All boards, circuitry, and other components of card 700 may, for example, be encapsulated by an injection molding process and sandwiched between two layers of laminate to form card assembly 710 having no exposed contacts. Alternately, for example, a surface of card assembly 710 may be formed by a layer of laminate such that electrical contacts may exist on a surface of card assembly 710 to provide connectivity from a surface of card assembly 710 to a processor (e.g., an EMV chip) of card 700.

RFID antenna 716 may, for example, be formed using additive and/or subtractive techniques to define patterns of a conductive element (e.g., copper) to form RFID antenna 716 (e.g., on a top side of board 702). Accordingly, for example, RFID antenna 716 may be applied to board 702 at a location proximate to a location of board 704. In so doing, for example, RFID antenna 716 may be applied to board 702 below a location where board 704 attaches to board 702 and conduction paths may be extended to RFID chip 718 from RFID antenna 716 (e.g., via conductive traces on board 702). Conductive leads 724 and 726 may, for example, provide electrical conductivity between board 708 and board 702 so that operational power may be provided to the active electrical components that may exist on board 702 from battery 714. Persons skilled in the art will appreciate that RFID antenna 716 may be placed anywhere on any board (e.g., around a perimeter of board 702) so as to maximize an effectiveness of RFID antenna 716.

Persons skilled in the art will further appreciate that any combination of processors, EMV chips, display drivers, dynamic magnetic stripe communications device drivers, RFID chips, and associated circuitry may be combined into one or more application specific integrated circuits (ASIC). Accordingly, for example, a core processor may interoperate with an ASIC that combines the functionalities of an RFID chip, a dynamic magnetic stripe communications device driver, and a display driver. Alternately, for example, a core processor, RFID chip, a dynamic magnetic stripe communications device driver, a display driver and associated electronics may be consolidated into a single ASIC. As per another example, a core processor and an RFID chip may be provided as discrete components that may interoperate with an ASIC that may be dedicated to dynamic magnetic stripe communications device driver functions and another ASIC that may be dedicated to display driver functions.

Figure 8:
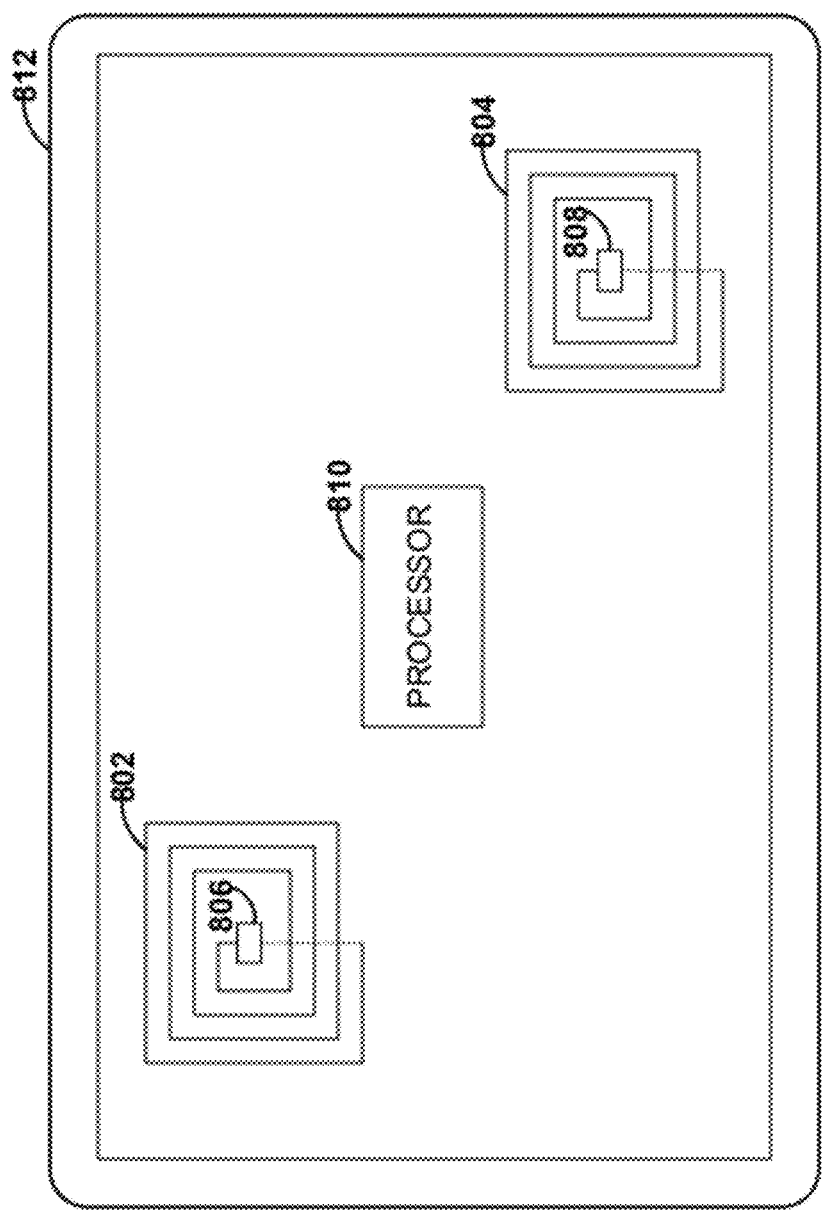
FIG. 8 is an illustration of a card constructed in accordance with the principles of the present invention.

FIG. 8 shows card 800, which may include multiple RFID antennas (e.g., RFID antennas 802-804) and associated RFID chips (e.g., RFID chips 806-808). Additional circuitry may be provided on card 800, which may include, for example, a processor, an EMV chip, a display, a display driver, driver circuitry for a dynamic magnetic stripe communications device, light emitting diodes, light sensors, infrared sensors and transmitters, capacitive sensing contacts, and a user interface (e.g., one or more buttons). All boards, circuitry, and other components of card 800 may, for example, be encapsulated by an injection molding process and sandwiched between two layers of laminate to form card assembly 812 having no exposed contacts. Alternately, for example, a surface of card assembly 812 may be formed by a layer of laminate such that electrical contacts may exist on a surface of card assembly 812 to provide connectivity from a surface of card assembly 812 to a processor (e.g., an EMV chip) of card 800.

Processor 810 may, for example, provide data to RFID chips 806 and/or 808 that may be communicated by RFID antenna 802 and/or RFID antenna 804, respectively. Processor 810 may, for example, receive data from RFID chips 806 and/or 808 that may be received by RFID antenna 802 and/or RFID antenna 804, respectively.

Card 800 may, for example, be placed within a communication distance of one or more RFID devices (e.g., one or more RFID enabled merchant terminals) in order to conduct a purchase transaction. Accordingly, for example, processor 810 may communicate track 1 and track 2 magnetic stripe data to the RFID enabled merchant terminal via RFID chip 806 and associated RFID antenna 802. Alternately, for example, processor 810 may communicate track 1 and track 2 magnetic stripe data to the RFID enabled merchant terminal via RFID chip 808 and associated RFID antenna 804.

As per another example, processor 810 may utilize both RFID antennas 802 and 804 and associated RFID chips 806 and 808, respectively, to increase communication efficiency. Accordingly, for example, processor 810 may communicate track 1 magnetic stripe data to RFID chip 806 and track 2 magnetic stripe data to RFID chip 808, so that track 1 magnetic stripe data may be communicated to an RFID enabled merchant terminal via RFID antenna 802 and track 2 magnetic stripe data may be communicated to an RFID enabled merchant terminal via RFID antenna 804. In so doing, for example, two tracks of magnetic stripe data may be communicated in half the time.

As per yet another example, RFID data communicated to RFID chips 806 and 808 by processor 810 may be communicated in a fashion such that multiple channels of information may be communicated in addition to the first and second channels of information communicated by RFID chips 806 and 808. For example, phase, frequency, and/or amplitude differences between data communicated by RFID chip 806/RFID antenna 802 and data communicated by RFID chip 808/RFID antenna 804 may be used to communicate multiple channels of information. Accordingly, for example, a first set of information may be communicated by RFID chip 806/RFID antenna 802, a second set of information may be communicated by RFID chip 808/RFID antenna 804, and a third set of information may be communicated as an amplitude difference between each data element of the first and second information sets. A fourth set of information may be communicated, for example, as a phase difference between each data element of the first and second data sets. A fifth set of information may be communicated, for example, as a rate of change of the phase difference (e.g., frequency difference) between each data element of the first and second information sets. Persons skilled in the art will appreciate that any number of channels of information may be communicated by a pair of RFID communicators when differences between RFID data sets communicated by each RFID communicator are exploited as data channels.

A pair of RFID communicators may, for example, be used to increase accuracy of RFID data communicated. For example, the same RFID data may be communicated by RFID chip 806/RFID antenna 802 as is communicated by RFID chip 808/RFID antenna 804 so as to increase a probability that an RFID reader may receive RFID data that was intended to be communicated. Accordingly, for example, an RFID reader that may be spatially oriented such that data reception quality from a first RFID communicator is diminished in relation to a data reception quality from a second RFID communicator, may nevertheless receive a complete set of RFID data due to the redundant RFID communication configuration.

An RFID reader may, for example, employ collision avoidance algorithms, so that communications received from a first RFID communicator do not trump communications received from a second RFID communicator. Accordingly, for example, processor 810 of card 800 may communicate to such an RFID reader that dual RFID communicators may be present within card 800. In so doing, for example, the RFID reader may activate its collision avoidance algorithm to accept RFID communications from both RFID communicators (e.g., RFID chip 806/RFID antenna 802 and RFID chip 808/RFID antenna 804) simultaneously.

RFID data may, for example, be received by RFID chip 806/RFID antenna 802 and RFID chip 808/RFID antenna 804. Accordingly, for example, card 800 may be an RFID reader that may utilize a pair of RFID readers (e.g., a first RFID reader is provided by RFID chip 806/RFID antenna 802 and a second RFID reader is provided by RFID chip 808/RFID antenna 804). In so doing, for example, processor 810 may impose an RFID communication protocol that accepts RFID data form each RFID reader simultaneously.

Figure 9:
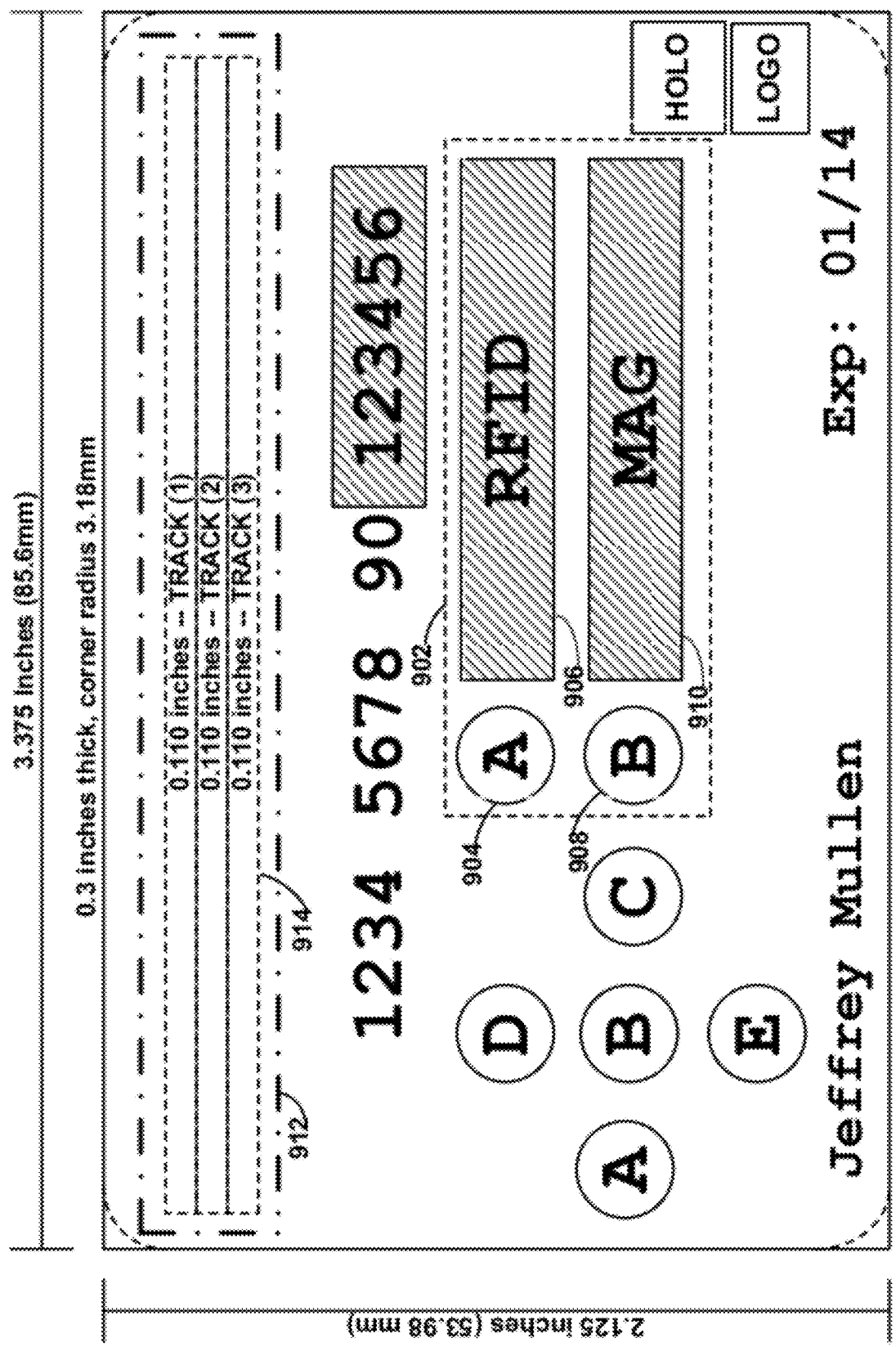
FIG. 9 is an illustration of a card constructed in accordance with the principles of the present invention.

FIG. 9 shows card 900 that may include, for example, configuration 902. Configuration 902 may include, for example, button 904, button 908, display 906 and display 910. Button 904 may be associated with display 906. Button 904 may be pressed to utilize the option described by display 906. Button 908 may be associated with display 910. Button 908 may be pressed to utilize the option described by display 910. A card may include additional buttons or displays or may not include the number of buttons or displays of card 900. For example, a card may include only a single button (e.g., button 904).

A user of card 900 may, for example, select options 906 or 910 when card 900 is to be used (e.g., when card 900 is to be utilized at a point-of-sale terminal to complete a purchase transaction). Accordingly, for example, a user of card 900 may press button 904 to select option 906 if the user wishes to exchange RFID data between card 900 and an RFID device. Alternately, for example, a user of card 900 may press button 908 to select option 910 if the user wishes to communication information to a magnetic stripe reader.

A user may, for example, press button 908 to prepare card 900 for communications with a magnetic stripe reader. Accordingly, for example, a processor of card 900 may initiate a mode of operation upon activation of option 910, whereby the processor searches for the presence of a read-head housing of a magnetic stripe reader. Once option 910 is activated, a user may bring card 900 within a communication distance of a magnetic stripe reader (e.g., the user may swipe card 900 through a magnetic stripe reader). Upon the detection of the read-head housing of the magnetic stripe reader, the processor may communicate one, two, and/or three tracks of magnetic stripe data to a read-head of the detected magnetic stripe reader via dynamic magnetic stripe communications device 914.

Alternately, for example, a user may press button 904 to prepare card 900 for communication with an RFID device. Accordingly, for example, a processor of card 900 may initiate a mode of operation upon activation of option 906, whereby a processor of card 900 provides magnetic stripe information (e.g., one, two, and/or three tracks of magnetic stripe data) to an RFID chip of card 900. Once option 906 is activated, a user may bring card 900 within a communication distance of an RFID reader (e.g., the user may wave card 900 within an RFID communication distance of an RFID reader) and an RFID communication sequence between card 900 and an RFID reader may be completed where RFID data may be provided to RFID antenna 912 from an RFID chip on card 900 and communicated from RFID antenna 912 to the RFID reader.

Upon activation of option 906, a processor of card 900 may activate passive RFID communications or active RFID communications using RFID antenna 912 and an associated RFID chip. Passive RFID communications, for example, may require little or no energy to be expended by card 900. Instead, RFID antenna 912 may collect energy from an RFID reader when a user of card 900 brings card 900 within a communication distance of the RFID reader. The energy collected by RFID antenna 912 may, for example, provide power to an RFID chip of card 900. In so doing, for example, an RFID chip of card 900 may communicate with a processor of card 900, so that the processor may populate a memory of the RFID chip with information (e.g., payment information) that may be needed to complete a transaction (e.g., a purchase transaction). Once populated with information, the RFID chip of card 900 may communicate the information to RFID antenna 912, which may then communicate the information to the RFID reader.

Active RFID communications from card 900 may, for example, utilize battery power from within card 900. Accordingly, for example, once card 900 is brought within a communication distance of an RFID reader, RFID antenna 912 may detect the RFID reader and may wake an RFID chip from a low-power state. In so doing, for example, an RFID antenna 912 may detect energy from an RFID reader and an RFID chip of card 900 may utilize battery power of card 900 to receive information from a processor of card 900 and to provide the received information to RFID antenna 912 for subsequent communication to an RFID reader.

Card 900 may, for example, operate as an RFID reader, such that when brought within a communication distance of another RFID device, an RFID chip of card 900 may interrogate the RFID device to determine whether the RFID device is to receive information from card 900 (e.g., the RFID device is operating as an RFID reader) or whether the RFID device is to communicate information to card 900 (e.g., the RFID device is operating as an RFID tag). Accordingly, for example, an RFID chip of card 900 may interrogate the RFID device to determine that the RFID device is an RFID tag an that RFID data may be communicated from the RFID device to an RFID chip of card 900. In so doing, for example, an RFID chip of card 900 may receive information, such as executable machine code, payment information, or any other type of information that may be required by card 900 to operate as intended and may forward such information to a processor of card 900 to be stored within a memory of card 900. As per one example, an RFID chip of card 900 may receive personalization information (e.g., cardholder information and cardholder account information) to prepare card 900 for use as a payment card.

Figure 10:
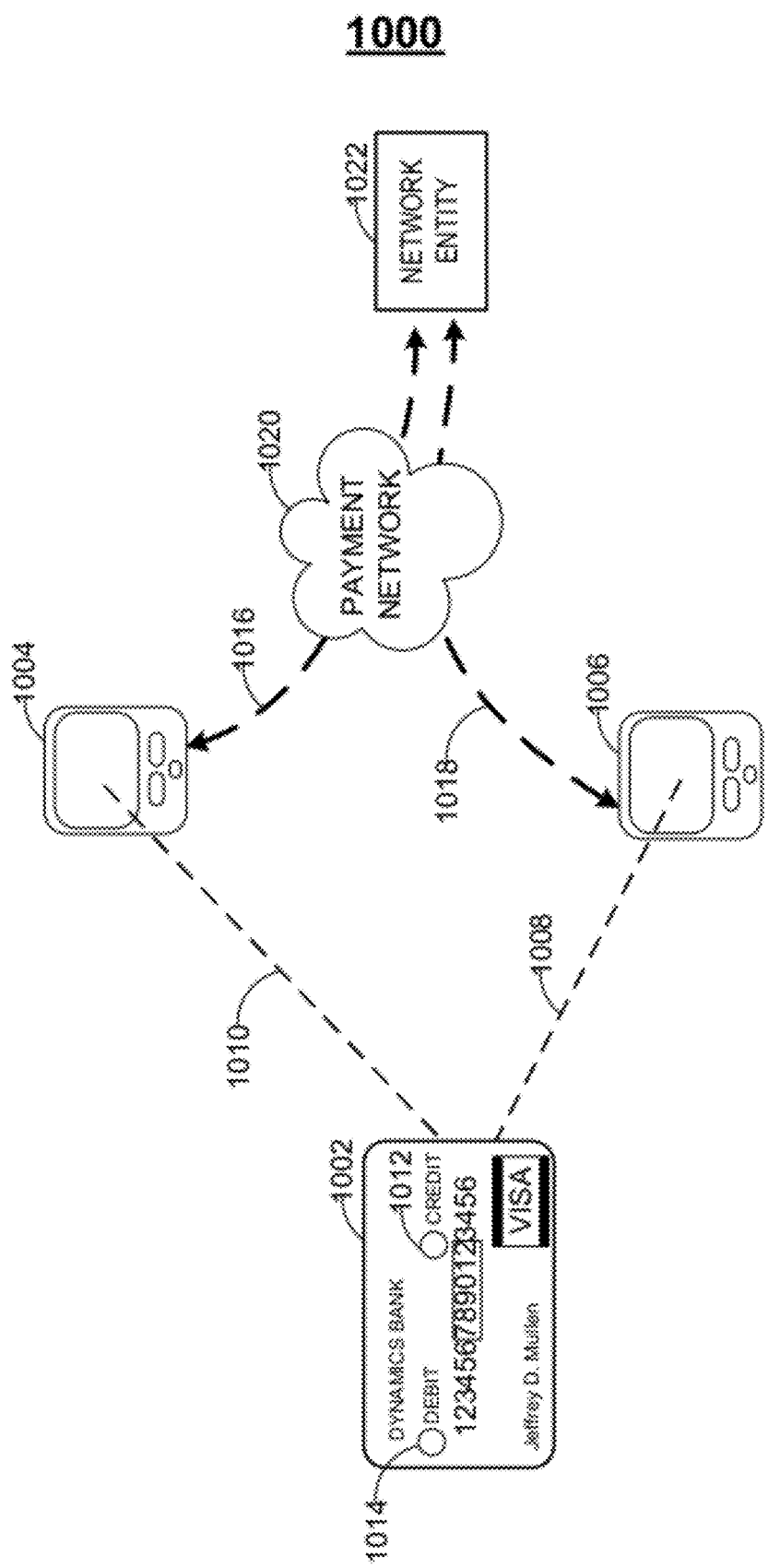
FIG. 10 is an illustration of a system constructed in accordance with the principles of the present invention.

FIG. 10 shows system 1000, which may include card 1002 and one or more RFID devices (e.g., mobile devices 1004 and 1006). Card 1002 may, for example, communicate with multiple RFID devices simultaneously. A user of card 1002 may, for example, enable RFID communications with card 1002 by pressing one of buttons 1012 or 1014. Accordingly, for example, payment information (e.g., payment account number and cardholder name) may be communicated from a core processor within card 1002 and stored within one or more RFID chips of card 1002. Data indicative of which button was pushed (e.g., discretionary data indicative of either credit button 1012 or debit button 1014) may also be communicated and stored within the one or more RFID chips of card 1002.

As per one example, card 1002 may provide two RFID communication devices that may detect an RF carrier field that may be generated by each of mobile devices 1004 and 1006. Users of mobile devices 1004 and 1006 may, for example, be husband and wife who may wish to store payment information associated with card 1002 on respective memory locations of mobile devices 1004 and 1004 so that such payment information may be used to complete purchase transactions using mobile devices 1004 and 1006.

A first RFID communication device of card 1002 may establish RFID communication channel 1010 with an RFID reader of mobile device 1004 and a second RFID communication device of card 1002 may establish communication channel 1008 with an RFID reader of mobile device 1006. Accordingly, for example, the first and second RFID communication devices of card 1002 may communicate payment information temporarily stored within an RFID chip of each respective RFID communication device of card 1002. In so doing, for example, mobile devices 1004 and 1006 may store payment information communicated via RFID communication channels 1010 and 1008, respectively, within respective memory locations of mobile devices 1004 and 1006. Mobile devices 1004 and 1006 may later recall such payment information from their respective memory locations, communicate the stored payment information via channels 1016 and 1018, respectively, of payment network 1020, and complete payment transactions with network entity 1022 using payment information received from card 1002.

Figure 11:
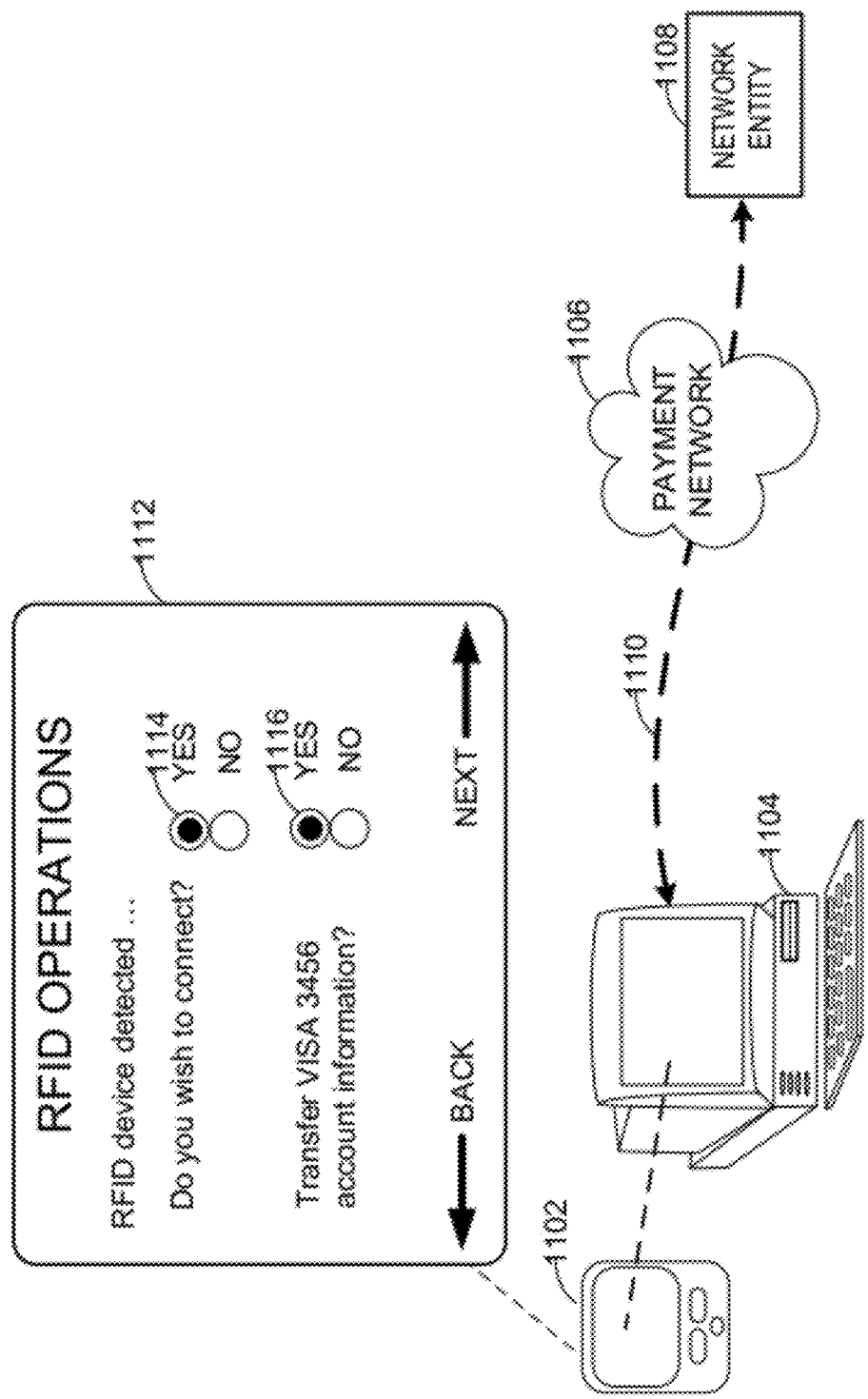
FIG. 11 is an illustration of a system constructed in accordance with the principles of the present invention.

FIG. 11 shows system 1100, which may include mobile device 1102, a stationary device (e.g., desktop computer 1104), payment network 1106, and network entity 1108. An application (e.g., RFID operations GUI 1112) may be executed by a processor of mobile device 1102 and may, for example, report a detection of an RFID device to a display of mobile device 1102. Such an RF device may, for example, include any device (e.g., desktop computer 1104) that may be RFID equipped. An RFID antenna and associated RFID chip may, for example, exist within desktop computer 1104 such that when mobile device 1102 is brought within an RFID communication distance of desktop computer 1104, an RFID antenna of mobile device 1102 may detect its presence, report the same to an RFID chip within mobile device 1102, which may then be reported to a processor of mobile device 1102 and reported to a user of mobile device 1102 via GUI 1112.

GUI 1112 may, for example, ask the user of mobile device 1102 whether he or she wishes to allow an RFID connection between mobile device 1102 and desktop computer 1104. The user may indicate his or her wish via radio buttons 1114 and may also indicate whether information (e.g., payment information) stored within a memory of mobile device 1102 is to be communicated to desktop computer 1104 via an RFID communication channel previously authorized by the user of mobile device 1102 (e.g., by selecting one of radio buttons 1116). If so, then such information may be communicated to desktop computer 1104 by mobile device 1102 and stored within a memory of desktop computer 1104. In so doing, for example, payment information communicated by mobile device 1102 to desktop computer 1104 may subsequently be communicated by desktop computer 1104 via communication channel 1110 of payment network 1106 to complete a purchase transaction (e.g., an online purchase of items contained within a shopping cart generated by an internet browser of desktop computer 1104) via network entity 1108.

Figure 12:
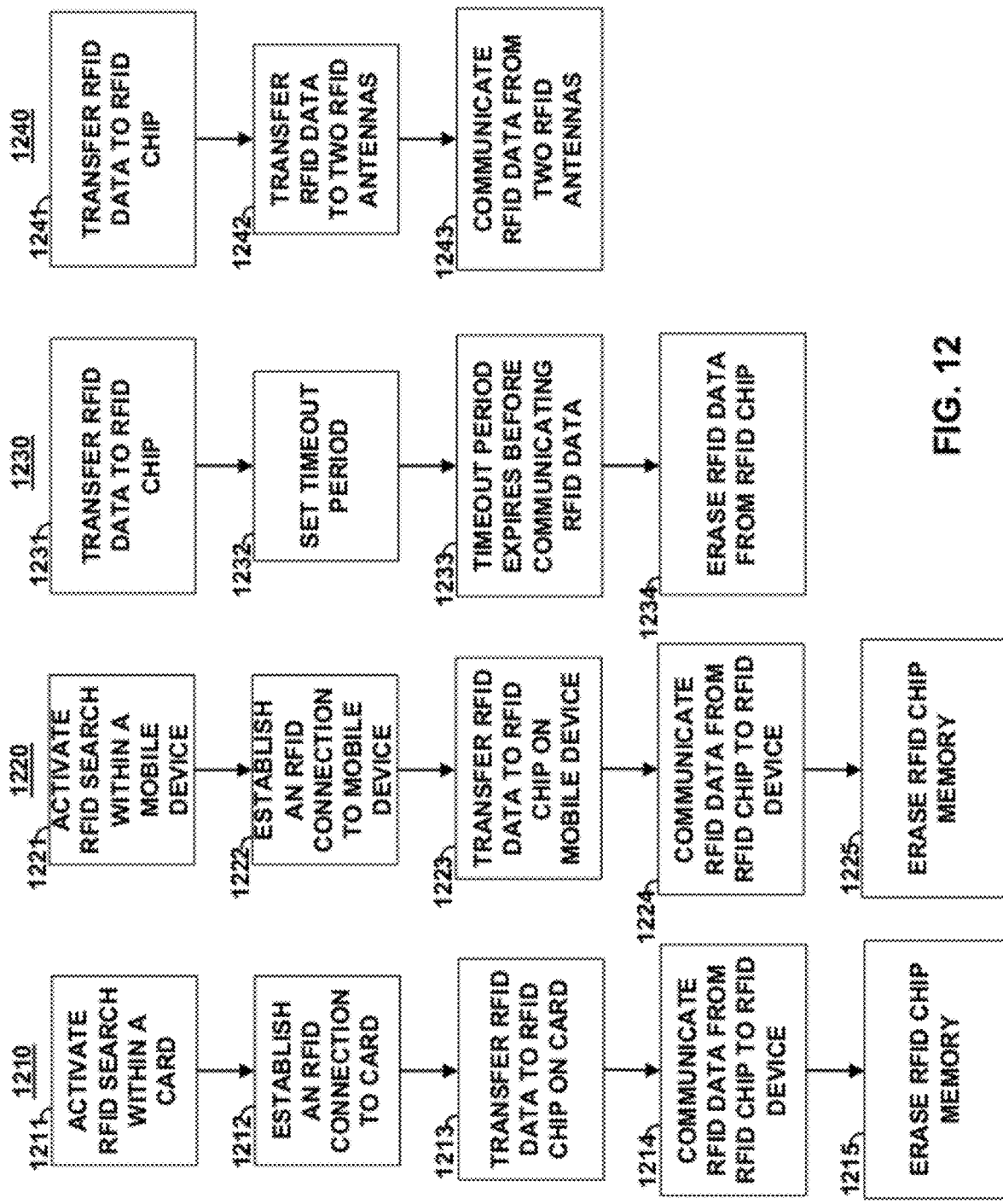
FIG. 12 is an illustration of process flow charts constructed in accordance with the principles of the present invention.

A flow diagram of communication sequences is shown in FIG. 12. Step 1211 of sequence 1210 may, for example, include activating an RFID search within a card. Accordingly, for example, a user interface (e.g., one or more buttons) of a card may be associated with a communication feature on the card, whereby pressing one of the buttons may activate an RFID communication device on the card. In step 1212, an RFID device may be detected by the card and an RFID connection may be established between the card and the RFID device. RFID data may, for example, be transferred to an RFID chip on the card (e.g., as in step 1213) and the RFID data contained within an RFID chip on the card may, for example, be communicated via an RFID antenna on the card to the RFID device (e.g., as in step 1214). Once RFID data is communicated, RFID data contained within an RFID chip on the card may be erased so as to reduce a likelihood of skimming RFID data from the RFID chip on the card.

Step 1221 of sequence 1220 may, for example, include activating an RFID search within a mobile device. Accordingly, for example, a user interface (e.g., a GUI executing on a processor of the mobile device) may be associated with a communication feature on the mobile device, whereby interfacing with the GUI may activate an RFID communication channel between a detected RFID device and the mobile device (e.g., as in step 1222). In step 1223, RFID data may, for example, be transferred to an RFID chip on the mobile device and the RFID data contained within an RFID chip on the mobile device may, for example, be communicated via an RFID antenna on the mobile device to the RFID device (e.g., as in step 1224). Once RFID data is communicated, RFID data contained within an RFID chip on the mobile device may be erased so as to reduce a likelihood of skimming RFID data from the RFID chip on the mobile device.

Step 1231 of sequence 1230 may, for example, include transferring RFID data from a core processor to an RFID chip on a card or a mobile device in preparation for communicating the RFID data via an RFID antenna on the card or the mobile device. If a timeout period that may be set in step 1232 expires before the RFID data is communicated by the card or mobile device (e.g., as in step 1233), then RFID data previously transferred to the RFID chip may be erased from the RFID chip by the core processor.

Step 1241 of sequence 1240 may, for example, include transferring RFID data from a core processor to an RFID chip on a card or a mobile device in preparation for communicating the RFID data via two RFID antennas on the card or the mobile device. In step 1242, the same data may be transferred to both RFID antennas. Alternately, for example, different data may be transferred each RFID antenna. In step 1243, both RFID antennas may communicate data to an RFID reader. As per one example, the same data may be communicated by both RFID antennas so as to increase a reliability of data communication. As per another example, different data may be communicated by each RFID antenna in order to increase an efficiency of data communication. As per yet another example, different data may be communicated by each RFID antenna, where differences (e.g., phase, frequency, and/or amplitude) may be used to communicate multiple other data channels.

Persons skilled in the art will appreciate that the present invention is not limited to only the embodiments described. Instead, the present invention more generally involves dynamic information and the exchange thereof. Persons skilled in the art will also appreciate that the apparatus of the present invention may be implemented in other ways than those described herein. All such modifications are within the scope of the present invention, which is limited only by the claims that follow.

What is claimed is:

1. A card, comprising:
   a first board including a first RFID chip, a first RFID antenna and a second RFID antenna; and
   a second board including a processor,
   wherein a first data is transferred from said processor to said first RFID chip via conductive terminals between said first and second boards and wherein said first data is communicated from said first RFID chip to a first RFID communication channel via said first RFID antenna.

2. A card, comprising:
   a first board including a first RFID antenna and a second RFID antenna; and
   a second board including a first RFID chip and a processor, wherein a first data is transferred from said processor to said RFID chip and wherein said first data is communicated from said first RFID chip to a first RFID communication channel via said first RFID antenna.

3. The card of claim 1, wherein second data is transferred from said processor to a second RFID chip via conductive terminals between said first and second boards and wherein said second data is communicated from said second RFID chip to a second RFID communication channel via said second RFID antenna, said first and second data being the same.

4. The card of claim 1, wherein second data is transferred from said processor to a second RFID chip via conductive terminals between said first and second boards and wherein said second data is communicated from said second RFID chip to a second RFID communication channel via said second RFID antenna, said first and second data being different.

5. The card of claim 1, wherein second data is transferred from said processor to a second RFID chip via conductive terminals between said first and second boards and wherein said second data is communicated from said second RFID chip to a second RFID communication channel via said second RFID antenna, wherein a difference between said first and second data forms information for a third RFID communication channel.

6. The card of claim 1, wherein second data is transferred from said processor to a second RFID chip via conductive terminals between said first and second boards and wherein said second data is communicated from said second RFID chip to a second RFID communication channel via said second RFID antenna, wherein a first difference between said first and second data forms information for a third RFID communication channel and a second difference between said first and second data forms information for a fourth RFID communication channel.

7. The card of claim 1, wherein said first data is erased from said first RFID chip after said first data is communicated from said first RFID chip to said first RFID communication channel.

8. The card of claim 1, wherein said first data is erased from said first RFID chip after a delay period has expired.

9. The card of claim 1, wherein said first and second boards are encapsulated, said encapsulation being laminated between first and second lamination layers.

10. The card of claim 1, further comprising a dynamic magnetic stripe communications device.

11. The card of claim 2, wherein second data is transferred from said processor to a second RFID chip and wherein said second data is communicated from said second RFID chip to a second RFID communication channel via said second RFID antenna, said first and second data being the same.

12. The card of claim 2, wherein second data is transferred from said processor to a second RFID chip and wherein said second data is communicated from said second RFID chip to a second RFID communication channel via said second RFID antenna, said first and second data being different.

13. The card of claim 2, wherein second data is transferred from said processor to a second RFID chip and wherein said second data is communicated from said second RFID chip to a second RFID communication channel via said second RFID antenna, wherein a first difference between said first and second data forms information for a third RFID communication channel.

14. The card of claim 2, wherein second data is transferred from said processor to a second RFID chip and wherein said second data is communicated from said second RFID chip to a second RFID communication channel via said second RFID antenna, wherein a first difference between said first and second data forms information for a third RFID communication channel and a second difference between said first and second data forms information for a fourth RFID communication channel.

15. The card of claim 2, wherein said first data is erased from said first RFID chip after said first data is communicated from said first RFID chip to said first RFID communication channel.

16. The card of claim 2, wherein said first data is erased from said first RFID chip after a delay period has expired.

17. The card of claim 2, wherein said first and second boards are encapsulated, said encapsulation being laminated between first and second lamination layers.

18. The card of claim 2, further comprising a dynamic magnetic stripe communications device.

19. A method comprising:
   communicating a first data from a device to a reader via a first RFID communication channel;
   communicating second data from said device to said reader via a second RFID communication channel;
   simultaneously receiving said first and second data via said reader; and
   avoiding collisions between said received first and second data within said reader,
   wherein said device includes a first RFID antenna and a second RFID antenna.

20. The method of claim 19, wherein said first and second data are different.

* * * * *